US010389929B2

(12) United States Patent
Uemura et al.

(10) Patent No.: US 10,389,929 B2
(45) Date of Patent: Aug. 20, 2019

(54) IMAGING SYSTEM, INSTRUCTION TERMINAL, RESPONSE TERMINAL, IMAGING METHOD, AND COMPUTER-READABLE RECORDING MEDIUM

(71) Applicant: Olympus Corporation, Hachioji-shi, Tokyo (JP)

(72) Inventors: Tatsuyuki Uemura, Tachikawa (JP); Keito Fukushima, Mitaka (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 79 days.

(21) Appl. No.: 15/692,892

(22) Filed: Aug. 31, 2017

(65) Prior Publication Data

US 2018/0070000 A1 Mar. 8, 2018

(30) Foreign Application Priority Data

Sep. 2, 2016 (JP) ................................ 2016-171994

(51) Int. Cl.
*H04N 5/232* (2006.01)
*H04N 5/77* (2006.01)
*H04N 5/225* (2006.01)
*H04N 5/76* (2006.01)

(52) U.S. Cl.
CPC ......... *H04N 5/23206* (2013.01); *H04N 5/772* (2013.01); *H04N 5/2256* (2013.01); *H04N 5/23293* (2013.01); *H04N 5/76* (2013.01)

(58) Field of Classification Search
CPC ............... H04N 5/23206; H04N 5/772; H04N 5/23293; H04N 5/76; H04N 5/2256
See application file for complete search history.

(56) References Cited

U.S. PATENT DOCUMENTS

2017/0041127 A1* 2/2017 Sharpe-Geisler ..... H04L 7/0012

FOREIGN PATENT DOCUMENTS

JP 2004297414 A 10/2004

* cited by examiner

*Primary Examiner* — Yogesh K Aggarwal
(74) *Attorney, Agent, or Firm* — John C. Pokotylo; Pokotylo Patent Services

(57) ABSTRACT

An imaging system includes: an instruction terminal configured to transmit, via a network, specific time-point information used to cause each of a plurality of response terminals to perform specific operation at a specific time-point, to each of the plurality of response terminals; and the plurality of response terminals configured to receive, via the network, the specific time-point information and execute the specific operation at the specific time-point. Before transmitting the specific time-point information, the instruction terminal transmits time-point information including at least information that corresponds to a time-point clocked by the instruction terminal, to each of the plurality of response terminals, and the response terminal adjusts the time-point clocked by the response terminal to the time-point information when the response terminal has received the time-point information, and thereafter, the response terminal executes the specific operation at the specific time-point when the response terminal receives the specific time-point information.

10 Claims, 23 Drawing Sheets

| RECEPTION PATTERN | NUMBER OF TIMES OF TRANSMISSION | | | SETTING METHOD |
|---|---|---|---|---|
| | 1 | 2 | 3 | |
| 1 | ○ | ○ | ○ | SET FIRST TRANSMISSION AS STARTING POINT, ADD "TRANSMISSION INTERVAL×(TOTAL NUMBER OF TIMES OF TRANSMISSION-1)" |
| 2 | ○ | ○ | | SET INTERMEDIATE POINT BETWEEN FIRST AND SECOND TRANSMISSION, ADD "TRANSMISSION INTERVAL×(TOTAL NUMBER OF TIMES OF TRANSMISSION-1)" |
| 3 | | ○ | ○ | OR, TIME-POINT SETTING FAILURE |
| 4 | ○ | | ○ | SET FIRST TRANSMISSION AS STARTING POINT, ADD "TRANSMISSION INTERVAL×(TOTAL NUMBER OF TIMES OF TRANSMISSION-1)" |
| 5 | ○ | | | TIME-POINT SETTING FAILURE |
| 6 | | ○ | | |
| 7 | | | ○ | |
| 8 | | | | |

IMAGING SYSTEM, INSTRUCTION TERMINAL, RESPONSE TERMINAL, IMAGING METHOD, AND COMPUTER-READABLE RECORDING MEDIUM

CROSS-REFERENCE TO RELATED APPLICATION

This application is based upon and claims the benefit of priority from Japanese Patent Application No. 2016-171994, filed on Sep. 2, 2016, the entire contents of which are incorporated herein by reference.

BACKGROUND

The present disclosure relates to an imaging system, an instruction terminal, a response terminal, an imaging method, and a computer-readable recording medium.

Regarding imaging apparatuses including digital cameras, there are known techniques of generating a plurality of sets of image data with mutually different viewpoints toward a subject by performing synchronized shooting in cooperation with each of a plurality of external imaging apparatuses (for example, refer to JP 2004-297414 A). With this technique, when a signal instructing shooting has been input from an operating unit, the imaging apparatus that received the input of the signal transmits a shooting time-point to another imaging apparatus, and thereafter, each of the imaging apparatuses starts clocking and performs shooting at the shooting time-point.

SUMMARY

An imaging system according to one aspect of the present disclosure may include: an instruction terminal configured to transmit, via a network, specific time-point information used to cause each of a plurality of response terminals to perform specific operation at a specific time-point, to each of the plurality of response terminals; and the plurality of response terminals configured to receive, via the network, the specific time-point information and execute the specific operation at the specific time-point, wherein, before transmitting the specific time-point information, the instruction terminal transmits time-point information including at least information that corresponds to a time-point clocked by the instruction terminal, to each of the plurality of response terminals, and the response terminal adjusts the time-point clocked by the response terminal to the time-point information when the response terminal has received the time-point information, and thereafter, the response terminal executes the specific operation at the specific time-point when the response terminal receives the specific time-point information.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 19 is a diagram schematically illustrating a time-point setting method according to a reception pattern in the imaging system according to the third embodiment of the present disclosure;

DETAILED DESCRIPTION

Hereinafter, embodiments of the present disclosure will be described in detail with reference to the drawings. Note that the present disclosure is not limited to the following embodiments. The drawings referred to in the following description merely schematically illustrate the shapes, sizes, and positional relations to such degrees that the contents of the present disclosure are understandable. Accordingly, the present disclosure is not limited only to the shapes, sizes, and positional relations exemplified in the individual drawings. Moreover, hereinafter, an operation terminal used in a monitoring system will be described as an exemplary operation terminal.

First Embodiment

General System Configuration

Figure 1:
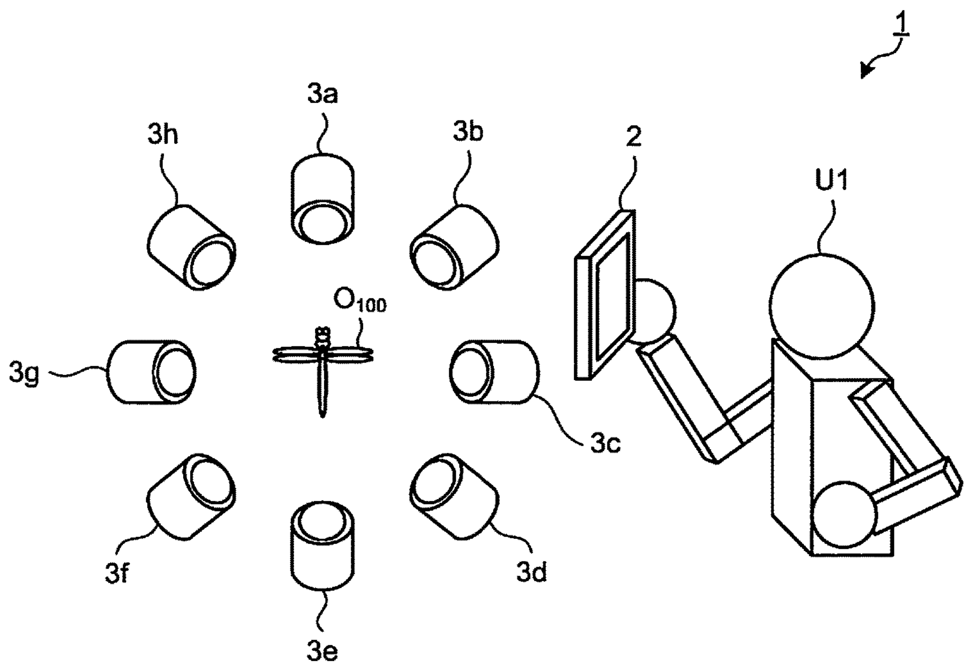
FIG. 1 is a schematic diagram illustrating a general configuration of an imaging system according to a first embodiment of the present disclosure.
Figure 2:
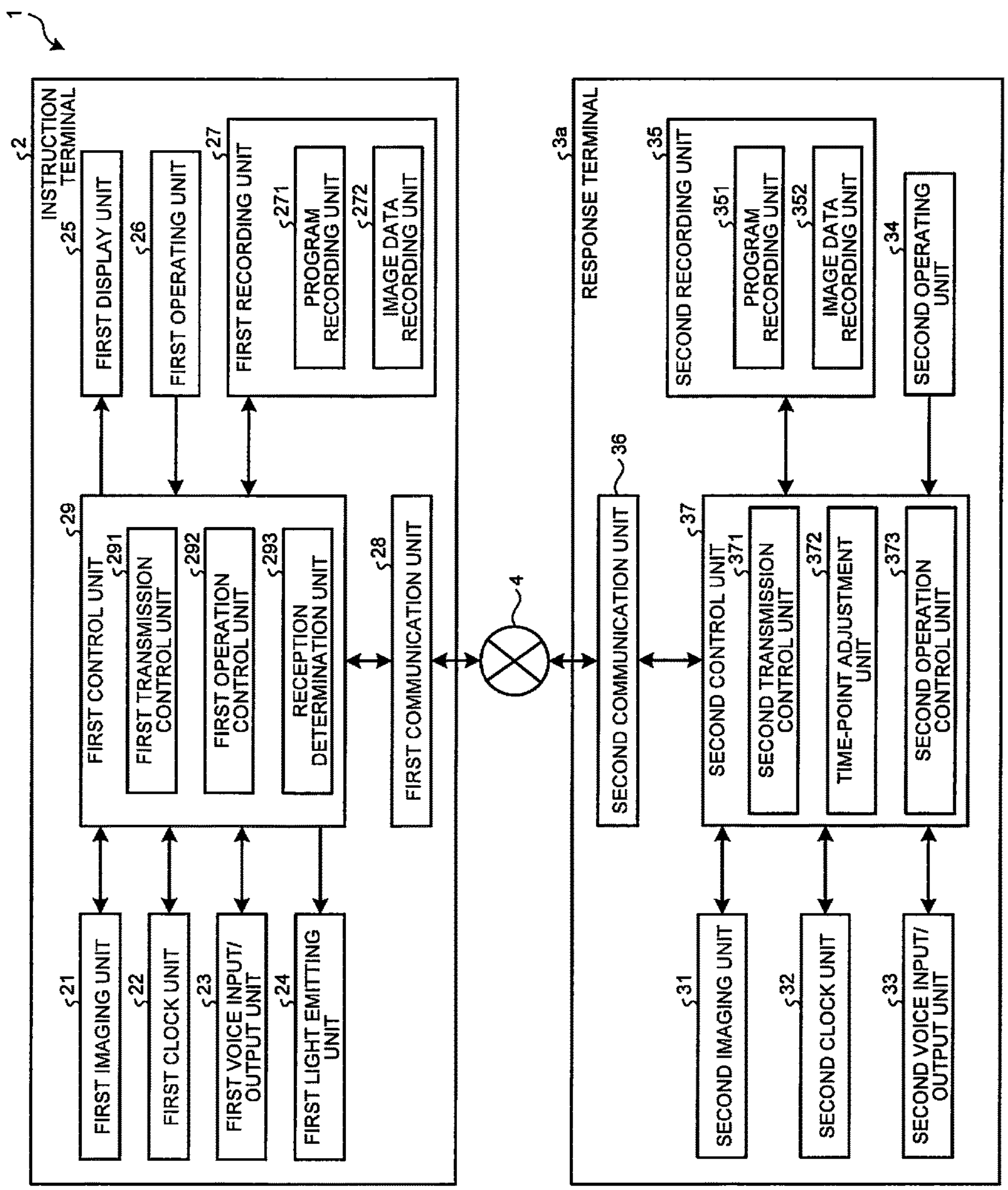
FIG. 2 is a block diagram illustrating a functional configuration of the imaging system according to the first embodiment of the present disclosure.

FIG. 1 is a schematic diagram illustrating a general configuration of an imaging system according to a first embodiment of the present disclosure. FIG. 2 is a block diagram illustrating a functional configuration of the imaging system according to the first embodiment of the present disclosure.

An imaging system 1 illustrated in FIGS. 1 and 2 simultaneously operates a plurality of response terminals 3*a* to 3*h* using an instruction terminal 2 held by a user U1. Specifically, the imaging system 1 causes each of the plurality of response terminals 3*a* to 3*h* to perform simultaneously, at a specific time-point, any of specific operations, for example, shooting, light emission, voice output, display, recording, and moving image shooting. More specifically, the imaging system 1 causes, at a time-point clocked by the instruction terminal 2, the time-point clocked by each of the plurality of response terminals 3*a* to 3*h* to be adjusted to the time-point clocked by the instruction terminal 2, and thereafter, causes each of the plurality of response terminals 3*a* to 3*h* to simultaneously perform the specific operation at the specific time-point. Furthermore, the instruction terminal 2 transmits time-point information regarding the time-point clocked by the instruction terminal 2 to each of the response terminals 3*a* to 3*h* via unicast, and thereafter, transmits specific time-point information via multicast. While this scene of use is emphasized herein due to difficulty in simultaneous shooting, it is of course allowable to have a mode other than simultaneous shooting as long as it is shooting performed in a specific designated time-span. Moreover, it is applicable not only to still image shooting but also to continuous shooting and moving image shooting, and also is helpful in uniformizing time-point information and time-span information given to these images.

Moreover, the instruction terminal 2 and the plurality of response terminals 3*a* to 3*h* are bidirectionally communicatively connected with each other via a network 4. Specifically, the instruction terminal 2 and the plurality of response terminals 3*a* to 3*h* are bidirectionally communicatively connected with each other using a predetermined frequency band (frequency band in accordance with radio communication standards of individual countries, e.g., 27 MHz, 40 MHz, 72 MHz, 73 MHz, 2.4 GHz, 5 GHz, and 5.8 GHz). Note that FIG. 1 illustrates a situation in which the plurality of response terminals 3*a* to 3*h* shoots a subject O100 with mutually different viewing fields. Furthermore, while the number of response terminals is assumed to be eight in FIG. 1, it is sufficient that there is at least one response terminal. Moreover, FIG. 2 uses a configuration with one response terminal 3*a* for description, because the response terminals 3*a* to 3*h* have a same configuration.

Still further, the instruction terminal 2 need not be a mobile phone, for example, but may be a terminal that can perform wireless communication. Moreover, each of the response terminals 3*a* to 3*h* need not be a cylindrical imaging apparatus, and may be, for example, an electronic device such as a mobile phone with an imaging function, a digital video camera, and a tablet-type mobile device with an imaging function, and a microscope used in endoscopy and microscopy.

Configuration of Instruction Terminal

First, the configuration of the instruction terminal 2 will be described. The instruction terminal 2 illustrated in FIGS. 1 and 2 can communicate with external devices and is implemented using a multi-functional mobile phone, or the like, that can provide various functions other than phone and mail. The instruction terminal 2 includes a first imaging unit 21, a first clock unit 22, a first voice input/output unit 23, a first light emitting unit 24, a first display unit 25, a first operating unit 26, a first recording unit 27, a first communication unit 28, and a first control unit 29.

Under the control by the first control unit 29, the first imaging unit 21 images a subject, generates image data, and outputs the image data to the first control unit 29. The first imaging unit 21 includes an optical system, an imaging element, and a signal processing circuit. The optical system is formed with a plurality of lenses, a shutter and a diaphragm, or the like. The imaging element generates image data by receiving a subject image focused by the optical system, and exemplary imaging elements include a charge coupled device (CCD) and a complementary metal oxide semiconductor (CMOS). The signal processing circuit includes circuits that perform processing such as A/D conversion and gain adjustment to the image data.

The first clock unit 22 includes a clocking function of clocking the time-point, and a determination function of determining the date-and-time of shooting. For example, in order to add time-point information and date-and-time data to the image data shot by the first imaging unit 21, the first clock unit 22 outputs the clocked time-point and determined date-and-time data to the first control unit 29. Since this is the instruction terminal 2, it is preferable to provide a time-point that can be a correct standard using a radio-controlled clock, or other information.

Under the control by the first control unit 29, the first voice input/output unit 23 inputs voice from the outside, generates voice data, and outputs the generated data to the first control unit 29, while reproducing the voice data input from the first control unit 29 and outputting the voice data to the outside. The first voice input/output unit 23 includes a microphone, a speaker, an amplifier, a conversion circuit, and the like. The microphone receives an input of voice. The speaker outputs voice data. The amplifier performs amplification, or the like, onto the voice data. The conversion circuit performs A/D conversion and D/A conversion onto the voice data.

Under the control by the first control unit 29, the first light emitting unit 24 emits light toward a shooting region of the first imaging unit 21. The first light emitting unit 24 includes a light emitting diode (LED) lamp, or the like.

Under the control of the first control unit 29, the first display unit 25 displays various types of information regarding the instruction terminal 2 and images corresponding to the image data. The first display unit 25 includes a display panel, a driver, and the like. The exemplary display panel uses liquid crystal, organic electroluminescence (EL), and the like.

The first operating unit 26 receives an input of a signal that instructs various types of operation related to the instruction terminal 2 and outputs the received signal to the first control unit 29. The first operating unit 26 includes a button, a switch, a touch panel, and the like.

The first recording unit 27 records various types of information regarding the instruction terminal 2, and image data. The first recording unit 27 includes a program recording unit 271 and an image data recording unit 272. The program recording unit 271 records a program executed by the instruction terminal 2. The image data recording unit 272 records the image data generated by the first imaging unit 21. The first recording unit 27 includes a non-volatile memory, a volatile memory, a recording medium that can be inserted from outside, and the like.

Under the control of the first control unit 29 and via the network 4, the first communication unit 28 transmits information to an external device or the response terminals 3*a* to 3*h*, while receiving information from the external device or the response terminals 3*a* to 3*h* and outputting the received information to the first control unit 29. The first communication unit 28 includes a predetermined communication module.

The first control unit 29 integrally controls individual components of the instruction terminal 2. The first control unit 29 is formed with a central processing unit (CPU), or the like. The first control unit 29 includes a first transmission control unit 291, a first operation control unit 292, and a reception determination unit 293.

Before transmission of specific time-point information including a specific time-point, the first transmission control unit 291 causes the first communication unit 28 to transmit, to each of the response terminals 3*a* to 3*h*, at least information that corresponds to the time-point clocked by the first clock unit 22 and time-point information including an instruction to adjust to the time-point clocked by the first clock unit 22. Furthermore, the first transmission control unit 291 causes the first communication unit 28 to transmit the time-point information simultaneously or sequentially to the response terminals 3*a* to 3*h*. Specifically, the first transmission control unit 291 transmits the time-point information via unicast or multicast. Furthermore, the first transmission control unit 291 causes the first communication unit 28 to transmit specific time-point information including specific time-point that is used for performing specific operation at a specific time-point, to each of the response terminals 3*a* to 3*h*.

The first operation control unit 292 controls operation of each of the first imaging unit 21, the first voice input/output unit 23, and the first light emitting unit 24.

The reception determination unit 293 determines the presence or absence of reception of setting completion information from each of the response terminals 3*a* to 3*h*, and outputs a result of determination to the first transmission control unit 291.

Configuration of Response Terminal

Next, the configuration of the response terminal 3*a* will be described. The response terminal 3*a* include a second imaging unit 31, a second clock unit 32, a second voice input/output unit 33, a second operating unit 34, a second recording unit 35, a second communication unit 36, and a second control unit 37.

Under the control by the second control unit 37, the second imaging unit 31 images a subject, generates image data, and outputs the image data to the second control unit 37. Similarly to the above-described first imaging unit 21, the second imaging unit 31 includes an optical system, an imaging element, a signal processing circuit, and the like.

The second clock unit 32 includes a clocking function of clocking time-points, and a determination function of determining the date-and-time of shooting. The second clock unit 32 outputs clocked time-point data and determined date-and-time data to the second control unit 37.

Under the control by the second control unit 37, the second voice input/output unit 33 inputs voice from the outside, generates voice data, and outputs the generated voice data to the second control unit 37, while reproducing the voice data input from the second control unit 37 and outputting the voice data to the outside. Similarly to the above-described first voice input/output unit 23, the second voice input/output unit 33 includes a microphone, a speaker, an amplifier, a conversion circuit, and the like.

The second operating unit 34 receives an input of a signal that instructs various types of operation related to the response terminal 3*a* and outputs the received signal to the second control unit 37. Similarly to the above-described first operating unit 26, the second operating unit 34 includes a button, a switch, a touch panel, and the like.

The second recording unit 35 records various types of information and data regarding the response terminal 3*a*. The second recording unit 35 includes a program recording unit 351 and an image data recording unit 352. The program recording unit 351 records a program executed by the response terminal 3*a*. The image data recording unit 352 records image data. Similarly to the above-described first recording unit 27, the second recording unit 35 includes a non-volatile memory, a volatile memory, a recording medium that can be inserted from outside.

Under the control of the second control unit 37, and via the network 4, the second communication unit 36 transmits image data and information indicating time-point setting completion to the instruction terminal 2 while receiving information from the instruction terminal 2 and outputting the received information to the second control unit 37. Similarly to the above-described first communication unit 28, the second communication unit 36 includes a predetermined communication module.

The second control unit 37 integrally controls individual components of the response terminal 3*a*. The second control unit 37 is formed with a CPU, or the like. The second control unit 37 includes a second operation control unit 373, a second transmission control unit 371, and a time-point adjustment unit 372.

The second transmission control unit 371 causes the second communication unit 36 to transmit setting completion information, that is, information indicating that the time-point clocked by the second clock unit 32 has been adjusted to the time-point according to the time-point information received from the instruction terminal 2.

The time-point adjustment unit 372 adjusts the time-point clocked by the second clock unit 32 to the time-point clocked by the first clock unit 22 of the instruction terminal 2 on the basis of time-point information transmitted from the instruction terminal 2. It is also allowable to configure to record information such as when, where, and by which device the time-point adjustment was performed. It is also allowable to enable the information to be recorded on a shot image. This can enhance reliability of the time-point.

The second operation control unit 373 controls operation of the second imaging unit 31. Specifically, when the second operation control unit 373 received specific time-point information via the second communication unit 36, the second operation control unit 373 causes the second imaging unit 31 to execute shooting when the time-point on the second clock unit 32 comes to a specific time-point. It is also allowable to enable information such as when, where, and by which device the time-point adjustment was performed, to be recorded onto the shot image. This can enhance reliability of the shooting time-point.

Outline of Operation of Imaging System

Figure 3:
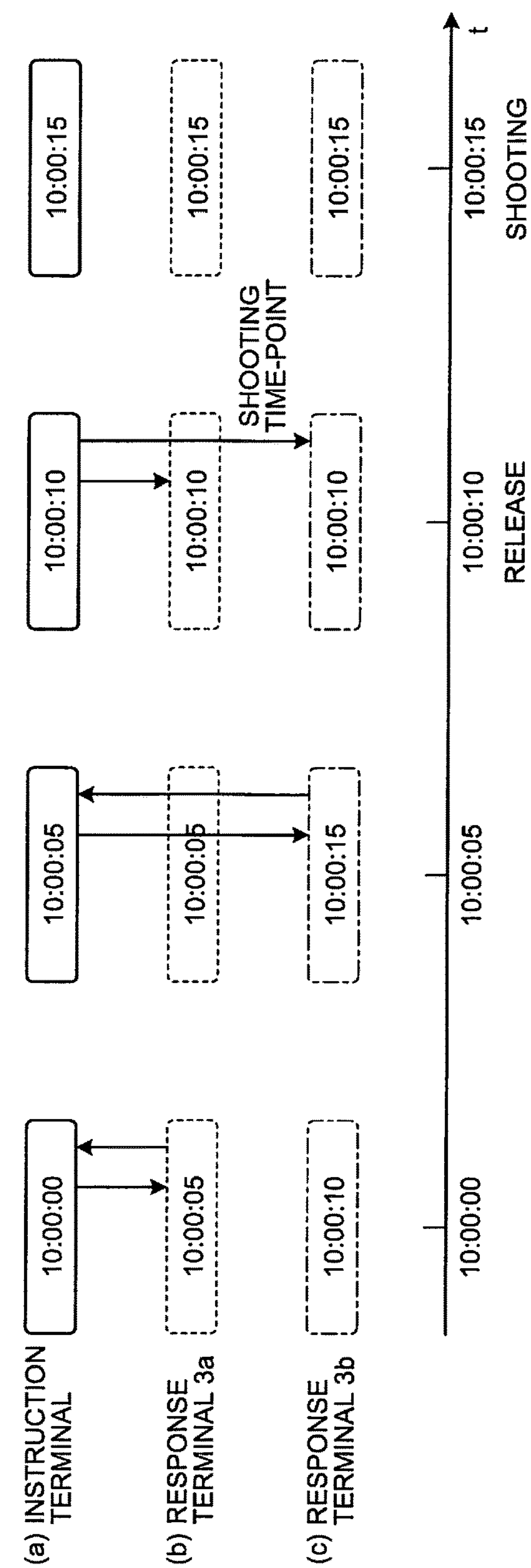
FIG. 3 is a timing chart schematically illustrating an outline of operation of the imaging system according to the first embodiment of the present disclosure.
Figure 4A:
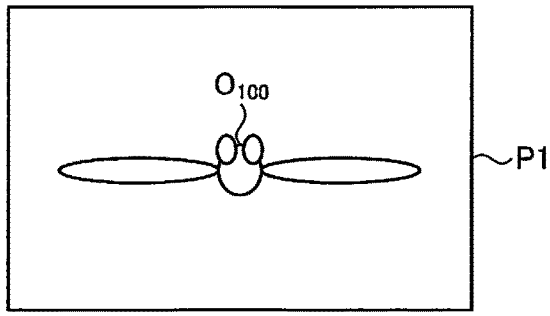
FIG. 4A is a diagram illustrating an exemplary image captured by a response terminal according to the first embodiment of the present disclosure.
Figure 4B:
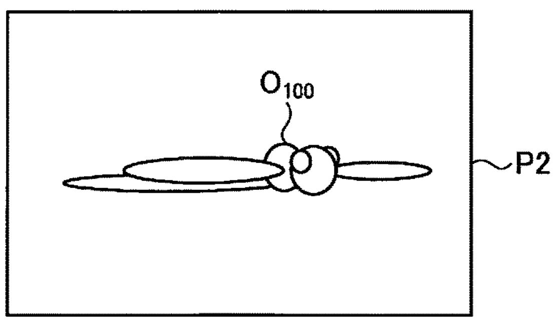
FIG. 4B is a diagram illustrating an exemplary image captured by the response terminal according to the first embodiment of the present disclosure.
Figure 4C:
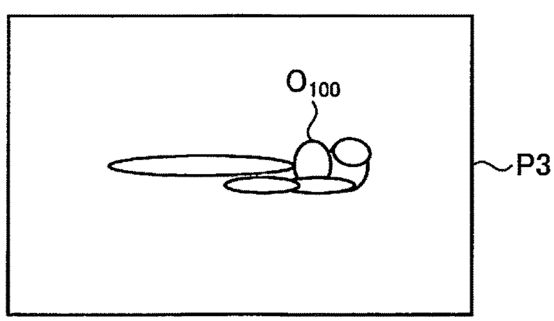
FIG. 4C is a diagram illustrating an exemplary image captured by the response terminal according to the first embodiment of the present disclosure.
Figure 4D:
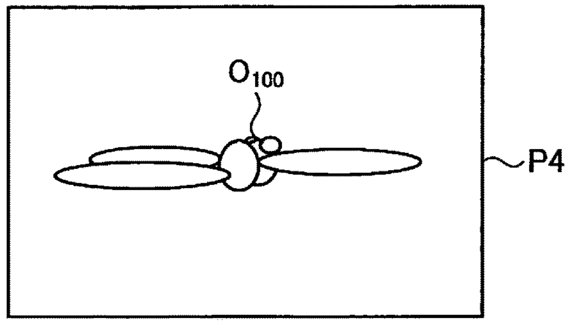
FIG. 4D is a diagram illustrating an exemplary image captured by the response terminal according to the first embodiment of the present disclosure.
Figure 4E:
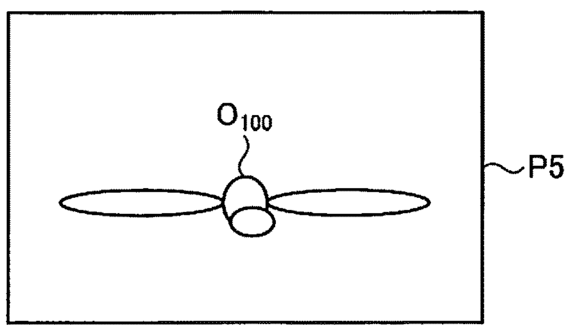
FIG. 4E is a diagram illustrating an exemplary image captured by the response terminal according to the first embodiment of the present disclosure.
Figure 4F:
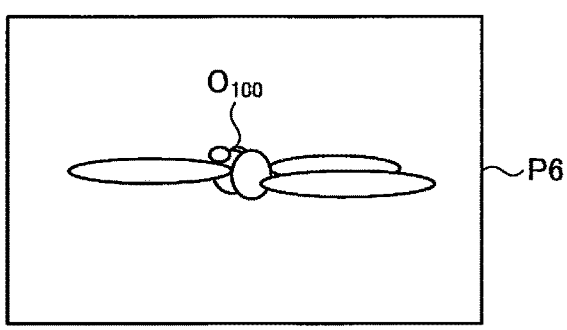
FIG. 4F is a diagram illustrating an exemplary image captured by the response terminal according to the first embodiment of the present disclosure.
Figure 4G:
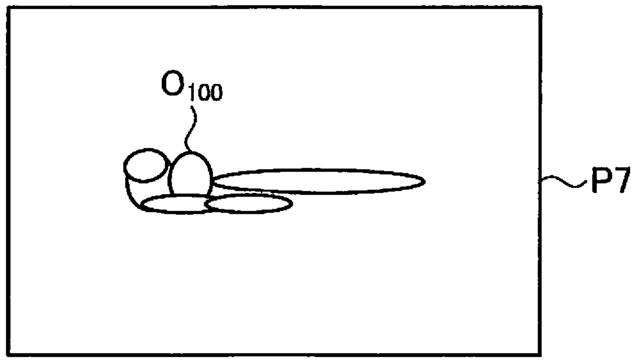
FIG. 4G is a diagram illustrating an exemplary image captured by the response terminal according to the first embodiment of the present disclosure.
Figure 4H:
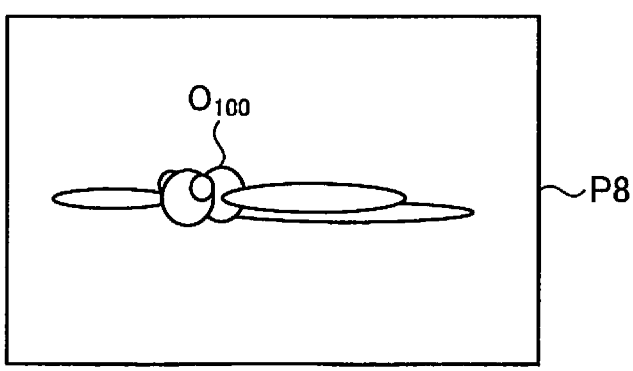
FIG. 4H is a diagram illustrating an exemplary image captured by the response terminal according to the first embodiment of the present disclosure.

Next, an outline of operation of the imaging system 1 will be described. FIG. 3 is a timing chart schematically illustrating an outline of operation of the imaging system 1. For simplification of description, FIG. 3 illustrates operation of each of the instruction terminal 2, the response terminal 3*a*, and the response terminal 3*b*. Note that while FIG. 3 illustrates the time-point, the time-point information includes date-and-time data.

As illustrated in FIG. 3, in order to adjust a time-point (10:00:05) of the response terminal 3*a* and a time-point (10:00:10) of the response terminal 3*b*, which differ from a time-point (10:00:00) clocked by the first clock unit 22, to the time-point clocked by the first clock unit 22, the instruction terminal 2 transmits time-point information including the time-point clocked by the first clock unit 22, to each of the response terminal 3*a* and the response terminal 3*b* via the network 4. Specifically, the instruction terminal 2 first transmits the time-point information including the time-point clocked by the first clock unit 22 to the response terminal 3*a* in order to adjust the time-point of each of the response terminal 3*a* and the response terminal 3*b* to the time-point (10:00:00) clocked by the first clock unit 22. In this case, the response terminal 3*a* adjusts the time-point (10:00:05) clocked by the second clock unit 32 to the time-point (10:00:00) clocked by the first clock unit 22 on the basis of the time-point clocked by the first clock unit 22 included in the time-point information, and thereafter, the response terminal 3*a* transmits setting completion information indicating that the time-point adjustment has been performed to adjust to the time-point according to the time-point information, to the instruction terminal 2.

Subsequently, the instruction terminal 2 transmits the time-point information including the time-point (10:00:05) clocked by the first clock unit 22, to the response terminal 3*b* via the network 4. In this case, the response terminal 3*b* adjusts the time-point (10:00:10) clocked by the second clock unit 32 to the time-point (10:00:05) clocked by the first clock unit 22 of the instruction terminal 2 on the basis of the time-point clocked by the first clock unit 22 included in the time-point information, and thereafter, the response terminal 3*b* transmits setting completion information indicating that the time-point adjustment has been performed to adjust to the time-point according to the time-point information, to the instruction terminal 2.

Thereafter, the instruction terminal 2 transmits, to the response terminal 3*a* and the response terminal 3*b*, specific time-point information (10:00:10) for causing each of the response terminal 3*a* and the response terminal 3*b* to perform simultaneous shooting at a specific time-point (10:00:15). With this configuration, the response terminal 3*a* and the response terminal 3*b* shoot the subject simultaneously at the specific time-point (10:00:15). As a result, when the response terminals 3*a* to 3*h* are used under the situation illustrated in FIG. 1, for example, the imaging system 1 can simultaneously obtain a plurality of images P1 to P8 with mutually different viewing fields for the subject O100, as illustrated in FIGS. 4A to 4H. While simultaneous recording is assumed herein, it is also allowable to configure to shift the time for a predetermined time-span, or configure to be able to designate separate specific time-points as the shooting time-points.

Operation of Instruction Terminal

Figure 5:
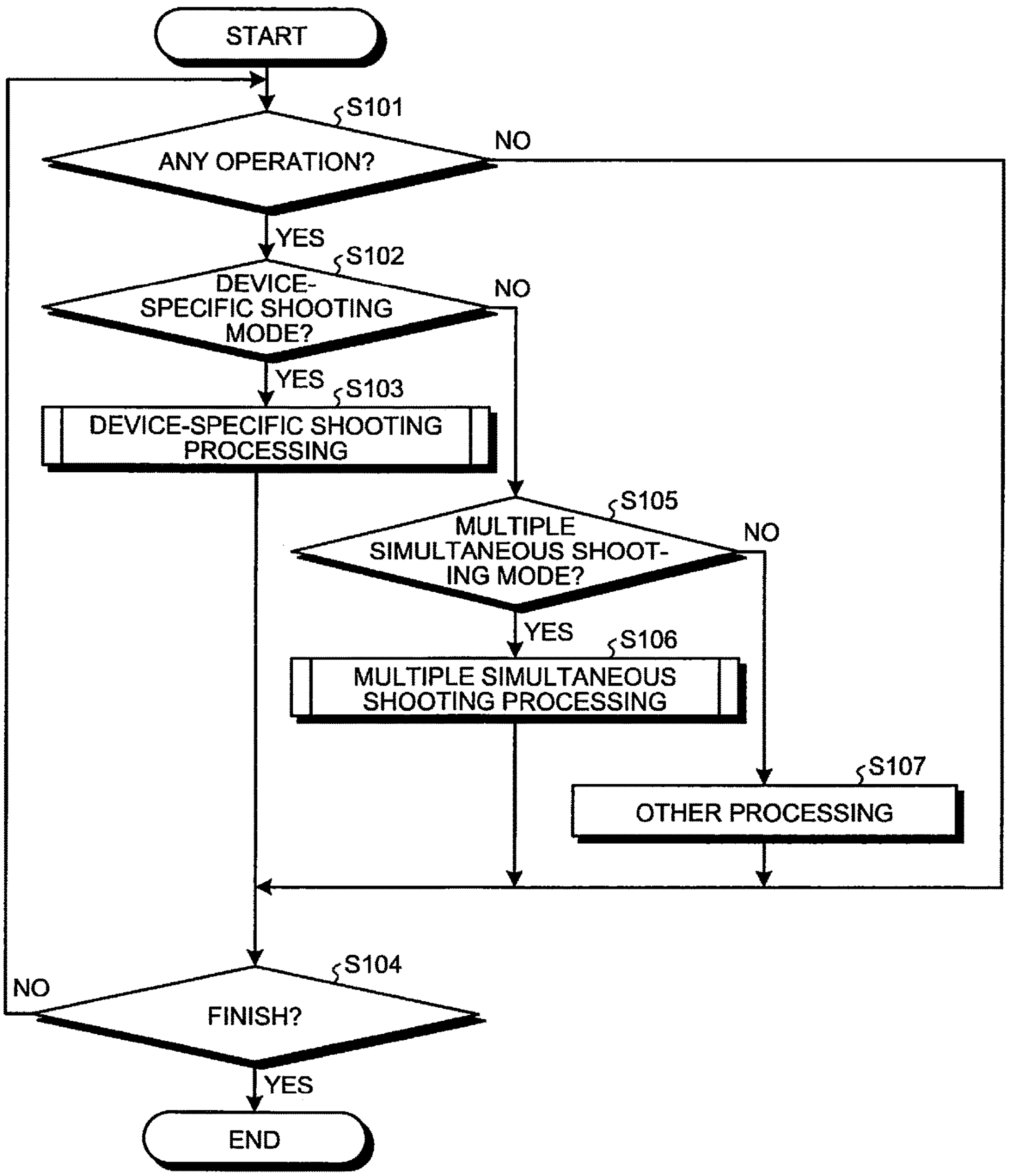
FIG. 5 is a flowchart illustrating operation of an instruction terminal according to the first embodiment of the present disclosure.

Next, operation of the instruction terminal 2 will be described. FIG. 5 is a flowchart illustrating operation of the instruction terminal 2.

Figure 6:
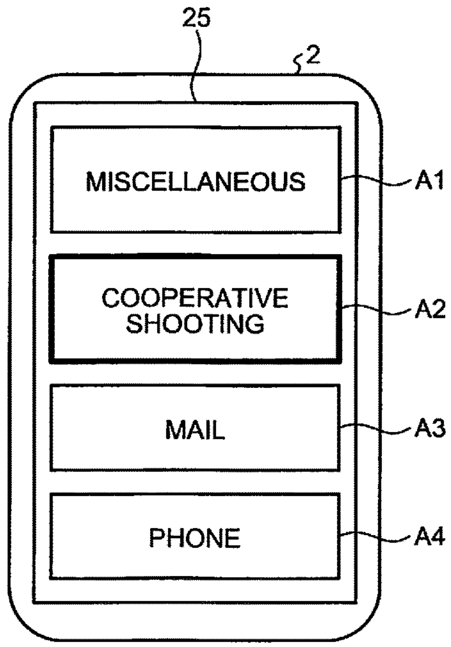
FIG. 6 is a diagram illustrating an exemplary image displayed by the instruction terminal according to the first embodiment of the present disclosure.
Figure 7:
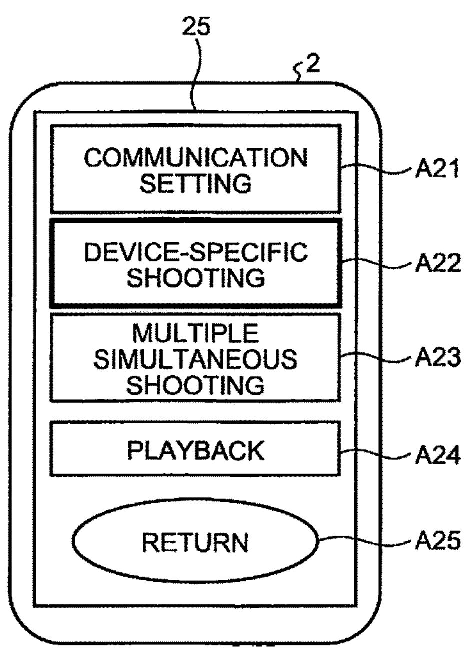
FIG. 7 is a diagram illustrating an exemplary image displayed by the instruction terminal according to the first embodiment of the present disclosure.

As illustrated in FIG. 5, when any operation is initially performed on the first operating unit 26 (step S101: Yes), and when a device-specific shooting mode is selected (step S102: Yes), the instruction terminal 2 executes device-specific shooting processing, that is, shooting performed in cooperation with a specific device (step S103). Specifically, as illustrated in FIG. 6, the instruction terminal 2 performs the following operation. Herein, assumed is a case where the first display unit 25 displays a miscellaneous icon A1, a cooperative shooting icon A2, a mail icon A3 and a phone icon A4, and the cooperative shooting icon A2 is selected via the first operating unit 26. Thereafter, as illustrated in FIG. 7, when the first display unit 25 displays a communication setting icon A21, a device-specific shooting icon A22, a multiple simultaneous shooting icon A23, a playback icon A24 and a return icon A25, and when the device-specific shooting icon A22 is selected, the instruction terminal 2 executes device-specific shooting processing, that is, shooting performed in cooperation with a specific device. Note that details of the device-specific shooting processing will be described below.

Moreover, in FIG. 6, the miscellaneous icon A1 receives an input of an instruction signal that instructs a change in various types of setting of the instruction terminal 2, the cooperative shooting icon A2 receives an input of an instruction signal that instructs shooting in cooperation with another device, the mail icon A3 receives an input of an instruction signal that instructs creation of a mail and transmission of the mail to another device, and the phone icon A4 receives an input of an instruction signal that instructs talking with another device. Furthermore, in FIG. 7, the communication setting icon A21 receives an input of an instruction signal that instructs setting of communication connection with external devices (e.g., response terminals 3*a* to 3*h*), the device-specific shooting icon A22 receives an input of an instruction signal that instructs setting of the device-specific shooting mode in which shooting is performed in cooperation with a specific device, the multiple simultaneous shooting icon A23 receives an input of an instruction signal to instruct setting of a multiple simultaneous shooting mode in which shooting is simultaneously performed in cooperation with a plurality of devices, the playback icon A24 receives an input of an instruction signal that instructs setting of a playback mode in which an image corresponding to the image data recorded on the first recording unit 27 is played back, and the return icon A25 receives an input of an instruction signal that instructs transition to a start screen.

In step S101, when no operation is performed on the first operating unit 26 (step S101: No), the instruction terminal 2 proceeds to step S104.

In step S104, when an instruction signal indicating finish has been input from the first operating unit 26 (step S104: Yes), the instruction terminal 2 finishes the current processing. In contrast, when the instruction signal indicating finish has not been input from the first operating unit 26 (step S104: No), the instruction terminal 2 returns to above-described step S101.

In step S102, when the device-specific shooting mode is not selected (step S102: No), the instruction terminal 2 proceeds to step S105 described below.

In step S105, when the multiple simultaneous shooting mode is selected via the first operating unit 26 (step S105: Yes), the instruction terminal 2 executes multiple simultaneous shooting processing in which shooting is simultaneously performed in cooperation with the plurality of response terminals 3*a* to 3*h* (step S106). Note that the multiple simultaneous shooting processing will be described in detail below. After step S106, the instruction terminal 2 proceeds to step S104.

In step S105, when the multiple simultaneous shooting mode is not selected via the first operating unit 26 (step S105: No), the instruction terminal 2 performs other processing, for example, cooperative processing performed in cooperation with external devices, and image data transfer processing (step S107). After step S107, the instruction terminal 2 proceeds to step S104.

Device-Specific Shooting Processing

Figure 8:
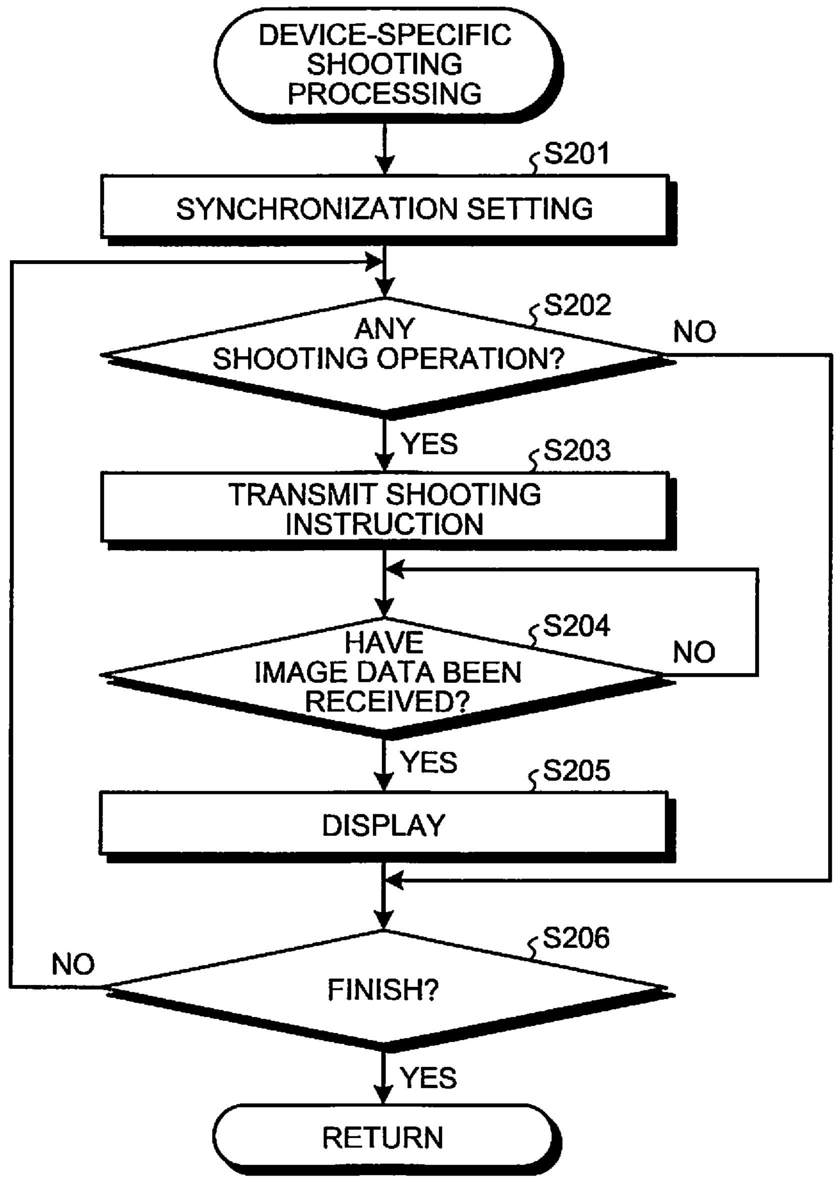
FIG. 8 is a flowchart illustrating an outline of device-specific shooting processing in FIG. 5.

Next, the device-specific shooting processing described in step S103 in FIG. 5 will be described in detail. FIG. 8 is a flowchart illustrating an outline of the device-specific shooting processing. Note that FIG. 8 illustrates a case where shooting is performed in cooperation with the response terminal 3*a* as a specific device.

As illustrated in FIG. 8, the instruction terminal 2 performs synchronization setting onto the response terminal 3*a* via the first communication unit 28 (step S201). Specifically, the instruction terminal 2 performs synchronization setting by transmitting a device address while receiving a password for the device address from the response terminal 3*a*, via the first communication unit 28.

Subsequently, when shooting operation is performed on the first operating unit 26 (step S202: Yes), the first transmission control unit 291 transmits a shooting instruction to the response terminal 3*a* via the first communication unit 28 (step S203).

Thereafter, when image data have been received from the response terminal 3*a* (step S204: Yes), the first control unit 29 displays, on the first display unit 25, an image that corresponds to the image data received from the response terminal 3*a* (step S205).

Subsequently, when an instruction signal indicating finish has been input via the first operating unit 26 (step S206: Yes), the instruction terminal 2 returns to the main routine in FIG. 5. In contrast, when the instruction signal indicating finish has not been input from the first operating unit 26 (step S206: No), the instruction terminal 2 returns to above-described step S202.

In step S202, when no operation is performed on the first operating unit 26 (step S202: No), the instruction terminal 2 proceeds to step S206.

In step S204, no image data have been received from the response terminal 3*a* via the first communication unit (step S204: No), the instruction terminal 2 waits until image data is received from the response terminal 3*a*. In this manner, it is possible to check composition, or the like, of the image obtained by each of the response terminals 3*a* to 3*h*. This configuration enables accurate setting, or the like.

Multiple Simultaneous Shooting Processing

Figure 9:
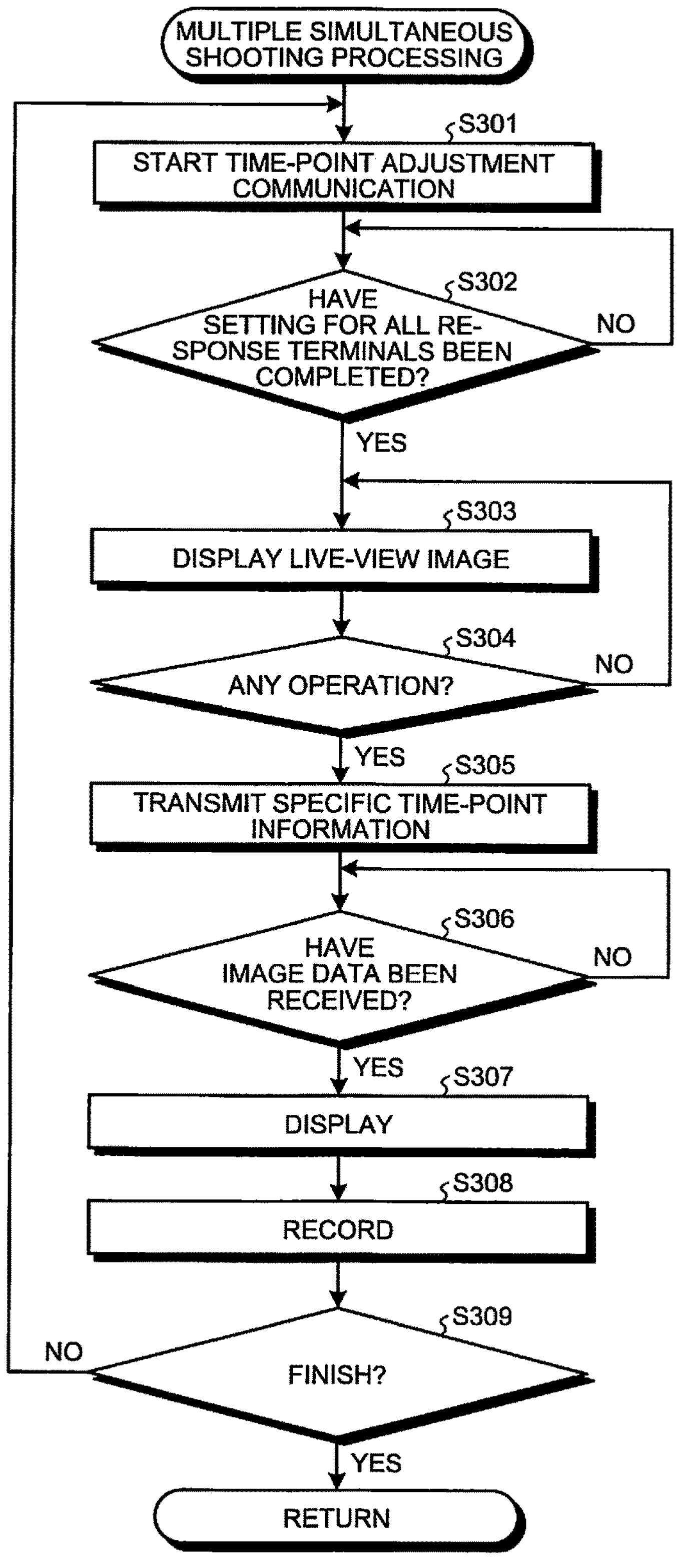
FIG. 9 is a flowchart illustrating an outline of multiple simultaneous shooting processing in FIG. 5.

Next, the multiple simultaneous shooting processing described in step S106 in FIG. 5 will be described. FIG. 9 is a flowchart illustrating an outline of multiple simultaneous shooting processing. Note that FIG. 9 illustrates a case where shooting is simultaneously performed in cooperation with the response terminals 3*a* to 3*h* as the plurality of devices.

As illustrated in FIG. 9, the first transmission control unit 291 starts time-point adjustment communication in which the time-point clocked by the second clock unit 32 is matched with each of the time-points clocked by the response terminals 3*a* to 3*h* (step S301). Specifically, via the first communication unit 28, the first transmission control unit 291 sequentially transmits, to each of the response terminals 3*a* to 3*h*, the time-point information including the time-point clocked by the first clock unit 22, while receiving setting completion information from each of the response terminals 3*a* to 3*h*.

Subsequently, the reception determination unit 293 determines whether the setting of each of the response terminals 3*a* to 3*h* operating in cooperation with the instruction terminal 2 is completed (step S302). Specifically, the reception determination unit 293 determines whether the setting completion information has been received from each of the response terminals 3*a* to 3*h*. When the reception determination unit 293 determines that the setting of each of the response terminals 3*a* to 3*h* operating in cooperation with the instruction terminal 2 is finished (step S302: Yes), the instruction terminal 2 proceeds to step S303 described below. In contrast, when the reception determination unit 293 determines that the setting of each of the response terminals 3*a* to 3*h* operating in cooperation with the instruction terminal 2 is not finished (step S302: No), the instruction terminal 2 continues this judgment. This processing enables reliable setting while judging whether each of the response terminals 3*a* to 3*h* responded correctly. Since each of the response terminals 3*a* to 3*h* is sequentially set regardless of the presence of some communication failures, it is possible to achieve synchronization of the response terminals 3*a* to 3*h* carefully although it might take a certain length of time. In this manner, this control enables achieving preparation for correct setting of each of the response terminals 3*a* to 3*h* and facilitates cooperative control in later stages.

Figure 10:
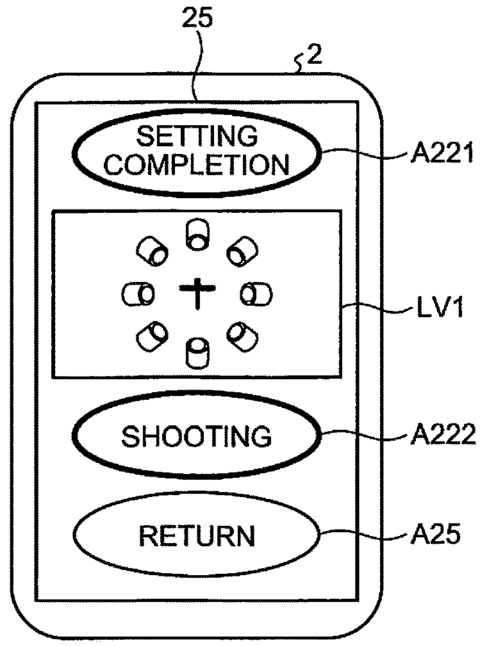
FIG. 10 is a diagram illustrating an exemplary image displayed by the instruction terminal according to the first embodiment of the present disclosure.

In step S303, the first control unit 29 displays a live-view image on the first display unit 25. Specifically, as illustrated in FIG. 10, the first control unit 29 displays, on the first display unit 25, a live-view image LV1 that corresponds to the image data generated by the first imaging unit 21. In this case, the first control unit 29 displays a setting completion icon A221, a shooting icon A222, and the return icon A25. The setting completion icon A221 indicates completion of time-point adjustment setting toward the response terminals 3*a* to 3*h*. The shooting icon A222 receives an input of an instruction signal of shooting. This configuration enables the user to intuitively grasp that shooting preparation for the response terminals 3*a* to 3*h* is completed. Note that the image may have coordinate information and terminal position information in association with the image data that can indicate which terminal corresponds to which display by the position, orientation, and posture at the time of shooting on the first imaging unit 21.

Subsequently, when the shooting icon A222 displayed by the first display unit 25 is operated via the first operating unit 26 (step S304: Yes), the first transmission control unit 291 simultaneously transmits specific time-point information to each of the response terminals 3*a* to 3*h* via the first communication unit 28 (step S305). Since time-point adjustment has been already completed, this communication is only required to give a cue as a trigger communication, and thus, the communication may be repeated for a plurality of times. Accordingly, even when there is a terminal that cannot communicate due to a certain failure, it is possible to perform simultaneous shooting after repetition for several times. In this manner, by performing sequential preparation and simultaneous shooting direction using a suitable communication method, high-accuracy simultaneous shooting is achieved. The result of the simultaneous shooting direction can be confirmed on a received image, and when the result is a failure, the simultaneous shooting direction may be continuously repeated. Synchronization that has been already completed can be omitted.

Figure 11:
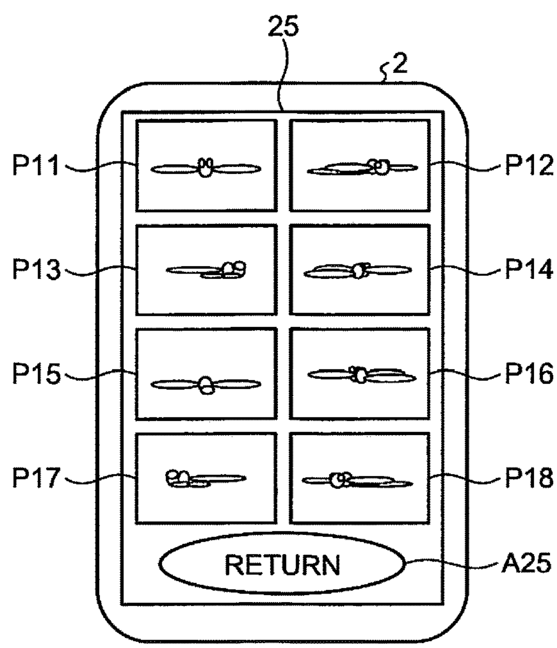
FIG. 11 is a diagram illustrating an exemplary image as a result of shooting by the response terminal displayed by the instruction terminal according to the first embodiment of the present disclosure.

Subsequently, when image data have been received from each of the response terminals 3*a* to 3*h* (step S306: Yes), the first control unit 29 displays, on the first display unit 25, a plurality of images that corresponds to each of the plurality of sets of image data received from each of the response terminals 3*a* to 3*h* (step S307). Specifically, as illustrated in FIG. 11, the first control unit 29 displays, on the first display unit 25, a plurality of images P11 to P18 that correspond to each of the plurality of sets of image data received from each of the response terminals 3*a* to 3*h*. This configuration enables the user to grasp the shooting result of the response terminals 3*a* to 3*h*. Note that while FIG. 11 illustrates a case where the first control unit 29 lists images P11 to P18 in a table, the first control unit 29 may, for example, display the images on the first display unit 25, in the order of image data received by the instruction terminal 2. Of course, the first control unit 29 may display the images P11 to P18 on the first display unit 25, reflecting the positions of the response terminals 3*a* to 3*h*. These may be displayed at a position adjacent to the live-view image LV1 in FIG. 10 aligned in the position and direction on the basis of positional information and orientation information of each of the response terminals 3*a* to 3*h*. This would be possible when the relationship between the coordinate and the response terminal position is recorded on the live-view image LV1. Moreover, it is also allowable to sort which image was obtained by which terminal by analyzing the obtained images. In addition, it is also allowable to display the image in a 3D image by analyzing the obtained image for better clarity in display.

Thereafter, the first control unit 29 records the plurality of sets of image data received from each of the response terminals 3*a* to 3*h*, onto the first recording unit 27 (step S308).

Subsequently, when an instruction signal indicating the finish of the multiple simultaneous shooting mode has been input from the first operating unit 26 (step S309: Yes), the instruction terminal 2 returns to the main routine in FIG. 5. In contrast, when an instruction signal indicating the finish of the multiple simultaneous shooting mode has not been input from the first operating unit 26 (step S309: No), the instruction terminal 2 returns to above-described step S301.

In step S304, when the shooting icon A222 displayed by the first display unit 25 is not operated via the first operating unit 26 (step S304: No), the instruction terminal 2 returns to above-described step S303.

In step S306, when no image data have been received from each of the response terminals 3*a* to 3*h* (step S306: No), the instruction terminal 2 continues this judgment until image data have been received from all the response terminals 3*a* to 3*h*.

Operation of Response Terminal

Figure 12:
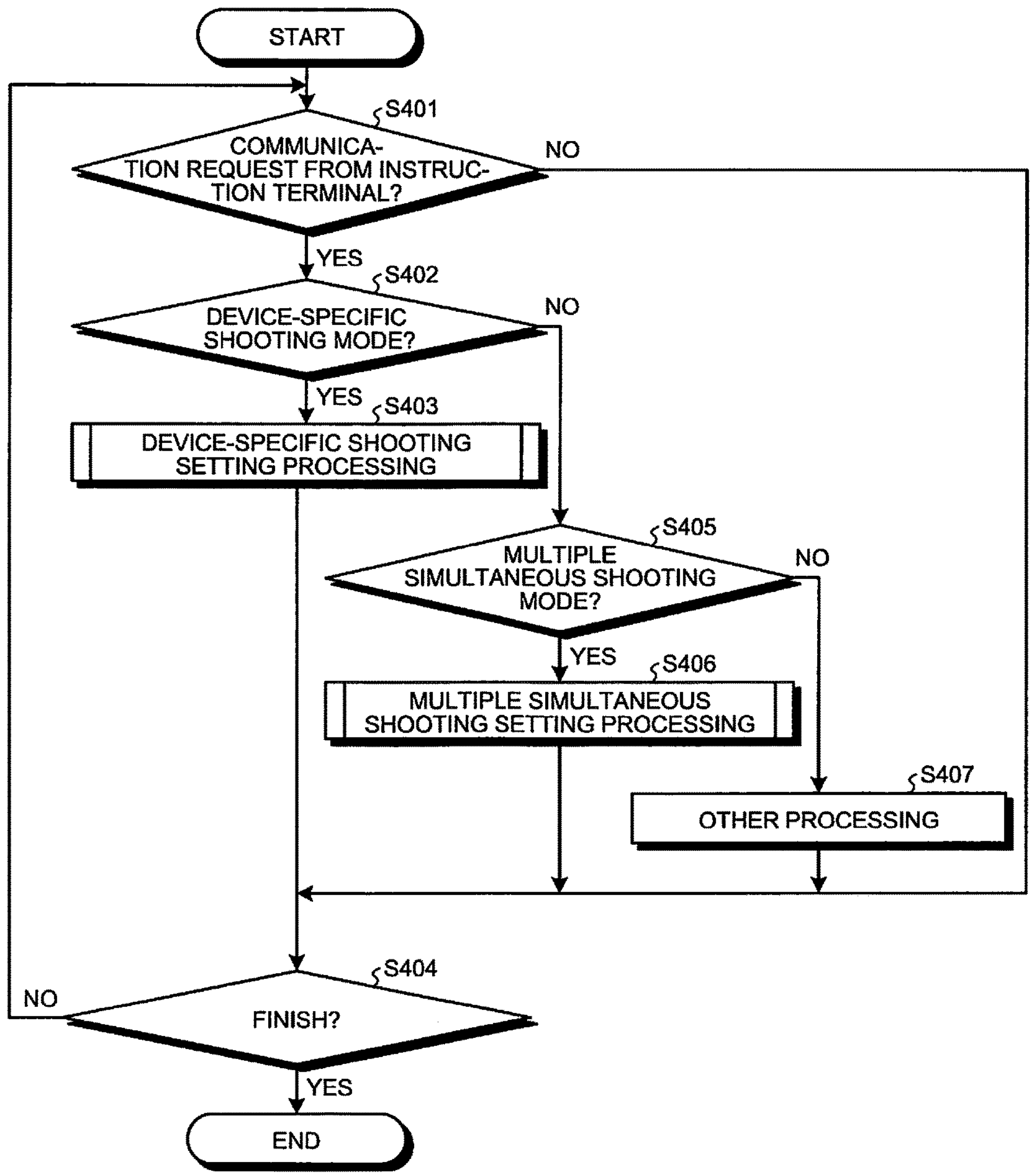
FIG. 12 is a flowchart illustrating operation of the response terminal according to the first embodiment of the present disclosure.

Next, operation of the response terminal 3*a* will be described. FIG. 12 is a flowchart illustrating operation of the response terminal 3*a*. Note that while FIG. 12 describes the response terminal 3*a*, the other response terminals 3*b* to 3*h* perform similar operation.

As illustrated in FIG. 12, when any communication request has been received from the instruction terminal 2 (step S401: Yes), the response terminal 3*a* proceeds to step S402 described below. In contrast, when the communication request has not been received from the instruction terminal (step S401: No), the response terminal 3*a* proceeds to step S404 described below.

In step S402, when the communication request from the instruction terminal 2 is the device-specific shooting mode (step S402: Yes), the response terminal 3*a* executes device-specific shooting setting processing (step S403). Note that details of the device-specific shooting setting processing will be described below.

Subsequently, when the instruction signal indicating finish has been input from the second operating unit 34 (step S404: Yes), the response terminal 3*a* finishes the current processing. In contrast, when instruction signal indicating finish has not been input from the second operating unit 34 (step S404: No), the response terminal 3*a* returns to above-described step S401.

In step S402, when the communication request from the instruction terminal 2 is not the device-specific shooting mode (step S402: No), the response terminal 3*a* proceeds to step S405 described below.

In step S405, when the communication request from the instruction terminal 2 is the multiple simultaneous shooting mode (step S405: Yes), the response terminal 3*a* executes multiple simultaneous shooting setting processing of simultaneously shooting the subject in cooperation with the other response terminals 3*b* to 3*h* (step S406). Note that the multiple simultaneous shooting setting processing will be described in detail below. After step S406, the response terminal 3*a* proceeds to step S404.

In step S405, when the communication request from the instruction terminal 2 is not the multiple simultaneous shooting mode (step S405: No), the response terminal 3*a* performs other processing, for example, processing of transmitting image data via the second communication unit 36 (step S407). After step S407, the response terminal 3*a* proceeds to step S404.

Device-Specific Shooting Setting Processing

Figure 13:
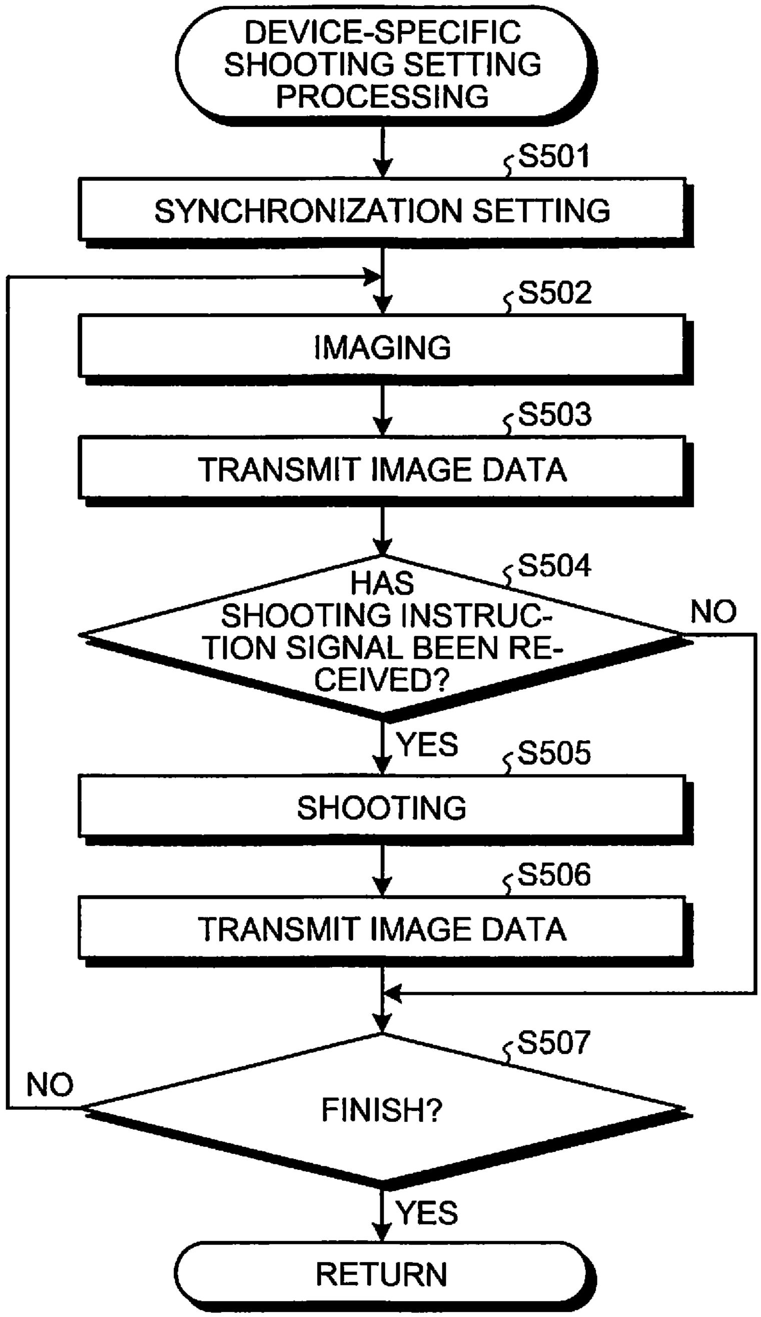
FIG. 13 is a flowchart illustrating an outline of device-specific shooting setting processing in FIG. 12.

Next, the device-specific shooting setting processing described in step S403 in FIG. 12 will be described in detail. FIG. 13 is a flowchart illustrating an outline of device-specific shooting setting processing.

As illustrated in FIG. 13, the response terminal 3*a* initially performs synchronization setting by transmitting a password that corresponds to the device address transmitted from the instruction terminal 2 via the second communication unit 36 (step S501).

Subsequently, the second operation control unit 373 causes the second imaging unit 31 to perform imaging (step S502).

Thereafter, the second transmission control unit 371 causes the second communication unit 36 to transmit the image data generated by the second imaging unit 31 to the instruction terminal 2 (step S503).

Subsequently, when the shooting instruction signal of instructing shooting is received from the instruction terminal 2 via the second communication unit 36 (step S504: Yes), the second operation control unit 373 causes the second imaging unit 31 to perform shooting (step S505).

Thereafter, the second transmission control unit 371 causes the second communication unit 36 to transmit the image data generated by the second imaging unit 31 to the instruction terminal 2 (step S506).

Subsequently, when an instruction signal indicating the finish of the device-specific shooting mode has been input from the instruction terminal 2 via the second communication unit 36 (step S507: Yes), the response terminal 3*a* returns to the main routine in FIG. 12. In contrast, when the instruction signal indicating the finish of the device-specific shooting mode has not been input from the instruction terminal 2 via the second communication unit 36 (step S507: No), the response terminal 3*a* returns to above-described step S502.

In step S504, when the shooting instruction signal of instructing shooting has not been received from the instruction terminal 2 via the second communication unit 36 (step S504: No), the response terminal 3*a* proceeds to step S507.

Multiple Simultaneous Shooting Setting Processing

Figure 14:
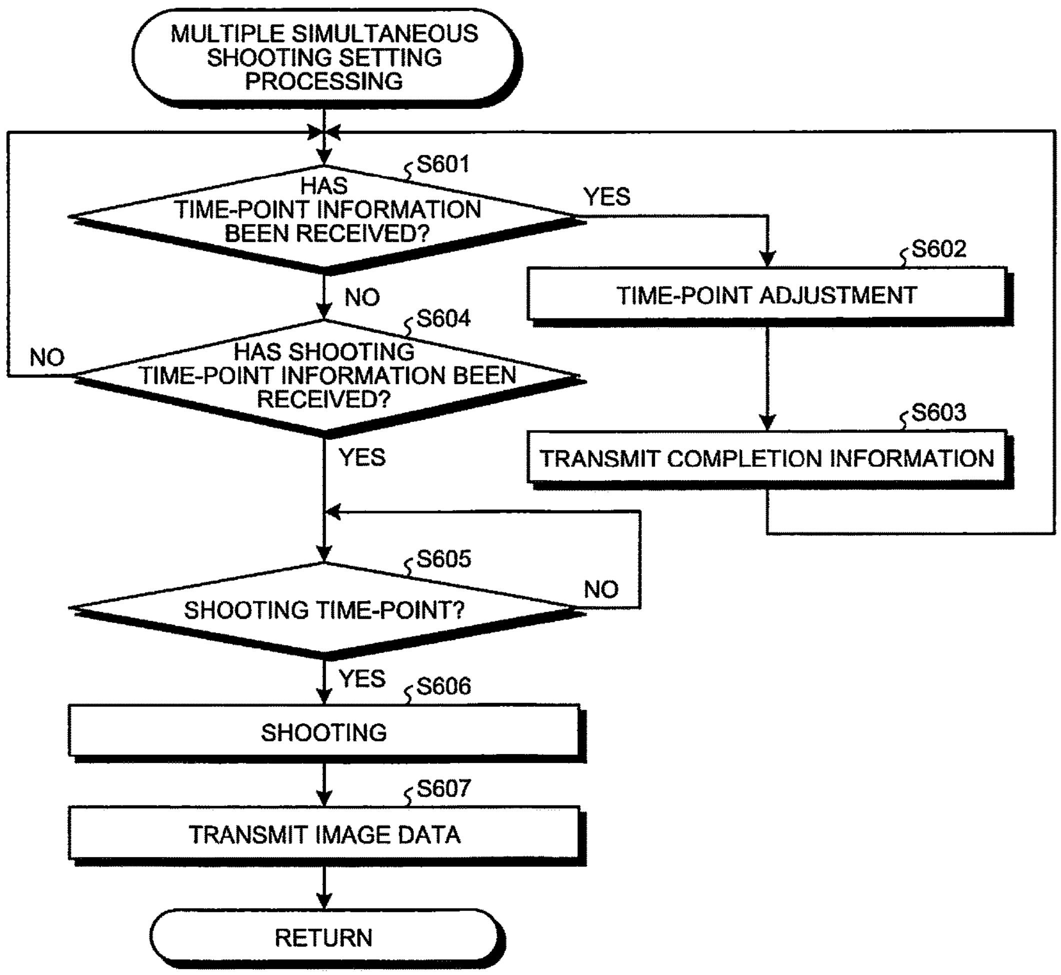
FIG. 14 is a flowchart illustrating an outline of multiple simultaneous shooting setting processing in FIG. 12.

Next, the multiple simultaneous shooting setting processing described in step S406 in FIG. 12 will be described in detail. FIG. 14 is a flowchart illustrating an outline of multiple simultaneous shooting setting processing.

As illustrated in FIG. 14, when the time-point information has been received from the instruction terminal 2 via the second communication unit 36 (step S601: Yes), the second control unit 37 adjusts the time-point of the second clock unit 32 to the time-point according to the time-point information (step S602).

Subsequently, the second control unit 37 causes the second communication unit 36 to transmit setting completion information indicating the completion of the time-point adjustment of the second clock unit 32 (step S603). After step S603, the response terminal 3*a* returns to above-described step S601.

In step S601, when the time-point information has not been received from the instruction terminal 2 via the second communication unit 36 (step S601: No), the response terminal 3*a* proceeds to step S604 described below.

In step S604, when specific time-point information has been received via the second communication unit 36 (step S604: Yes), the response terminal 3*a* proceeds to step S605 described below. In contrast, when the specific time-point information has not been received via the second communication unit 36 (step S604: No), the response terminal 3*a* returns to above-described step S601.

In step S605, when the time-point clocked by the second clock unit 32 reaches a shooting time-point (step S605: Yes), the second operation control unit 373 causes the second imaging unit 31 to execute shooting (step S606).

Subsequently, the second transmission control unit 371 causes the second communication unit 36 to transmit the image data generated by the second imaging unit 31 to the instruction terminal 2 (step S607). After step S607, the response terminal 3*a* returns to the main routine in FIG. 12.

In step S605, when the time-point clocked by the second clock unit 32 has not reached the shooting time-point (step S605: No), the response terminal 3*a* continues this judgment until the time-point clocked by the second clock unit 32 reaches the shooting time-point.

According to the above-described first embodiment of the present disclosure, even in a case of shooting using the plurality of response terminals 3*a* to 3*h*, it is possible to perform the shooting with the same timing or individually designated timings.

Second Embodiment

Next, a second embodiment of the present disclosure will be described. While having a configuration identical to the imaging system according to the above-described first embodiment, an imaging system according to the second embodiment executes operation that differs from the operation executed by the imaging system according to the first embodiment. Specifically, the difference is in multiple simultaneous shooting processing executed by the instruction terminal and multiple simultaneous shooting setting processing executed by the response terminal, according to the second embodiment. Hereinafter, an outline of operation of the imaging system according to the second embodiment will be described first and thereafter, the multiple simultaneous shooting processing executed by the instruction terminal and the multiple simultaneous shooting setting processing executed by the response terminal, according to the second embodiment, will be described. A same reference sign will be given to the configuration identical to the configuration of the imaging system 1 according to the above-described first embodiment, and description for this will be omitted.

Outline of Operation of Imaging System

Figure 15:
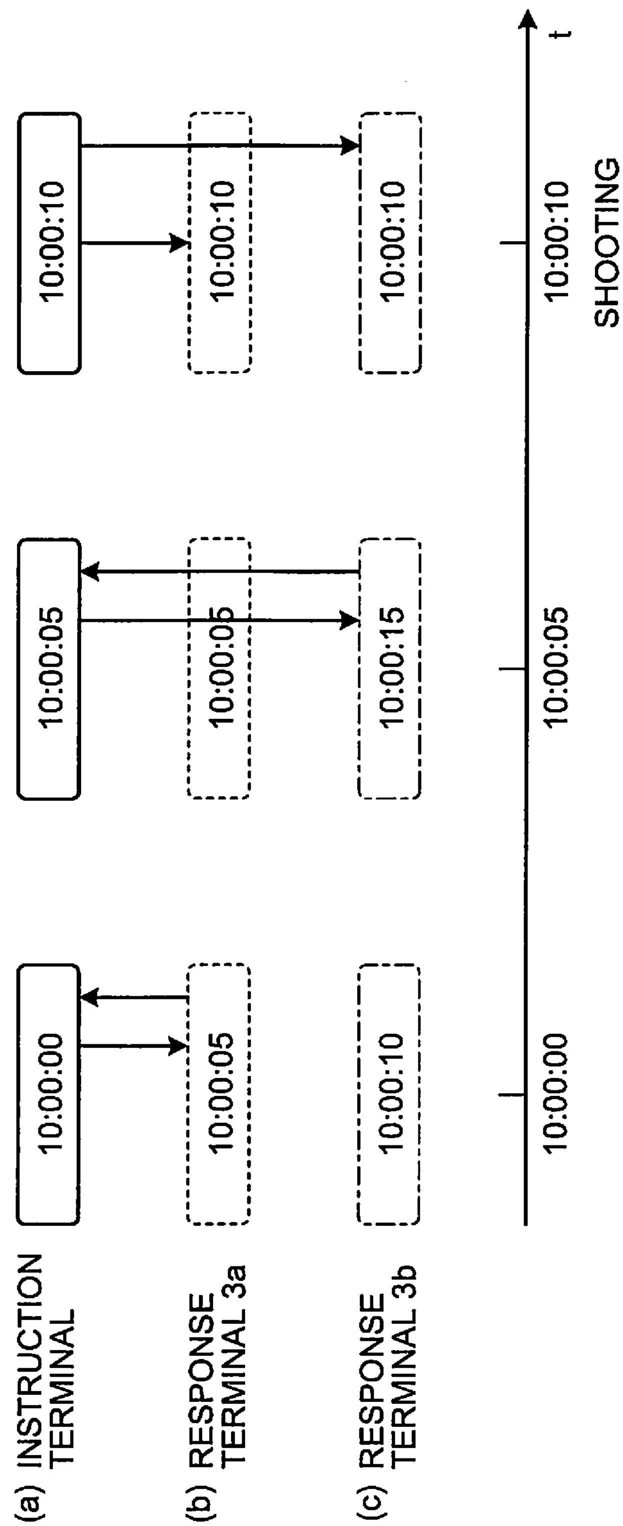
FIG. 15 is a timing chart schematically illustrating an outline of operation of the imaging system according to a second embodiment of the present disclosure.

FIG. 15 is a timing chart schematically illustrating an outline of operation of the imaging system 1 according to the second embodiment. For simplification of description, FIG. 15 illustrates operation of each of the instruction terminal 2, the response terminal 3*a*, and the response terminal 3*b*.

As illustrated in FIG. 15, in order to adjust each of a time-point (10:00:05) of the response terminal 3*a* and a time-point (10:00:10) of the response terminal 3*b*, each of which differs from a time-point (10:00:00) clocked by the first clock unit 22, to the time-point clocked by the first clock unit 22, the instruction terminal 2 transmits time-point information including the time-point clocked by the first clock unit 22, to each of the response terminal 3*a* and the response terminal 3*b* via the network 4. Specifically, the instruction terminal 2 initially transmits, via the network 4, the time-point information including the time-point clocked by the first clock unit 22 to the response terminal 3*a* in order to adjust to the time-point (10:00:00) clocked by the first clock unit 22. In this case, after adjusting the time-point (10:00:05) clocked by the second clock unit 32 to the time-point (10:00:00) clocked by the first clock unit 22, the response terminal 3*a* transmits setting completion information indicating that the time-point has been adjusted to the time-point clocked by the first clock unit 22, to the instruction terminal 2.

Subsequently, the instruction terminal 2 transmits the time-point information to the response terminal 3*b* via the network 4 in order to adjust the time-point to the time-point (10:00:05) clocked by the second clock unit 32 of the response terminal 3*a*. In this case, after adjusting the time-point (10:00:15) clocked by the second clock unit 32 to the time-point (10:00:05) clocked by the first clock unit 22, the response terminal 3*b* transmits setting completion information to the instruction terminal 2.

Thereafter, the instruction terminal 2 simultaneously transmits, via the network 4, specific time-point information including the shooting instruction signal, to each of the response terminal 3*a* and the response terminal 3*b*. With this configuration, the response terminal 3*a* and the response terminal 3*b* can image the subject simultaneously at the specific time-point (10:00:10).

Multiple Simultaneous Shooting Processing

Figure 16:
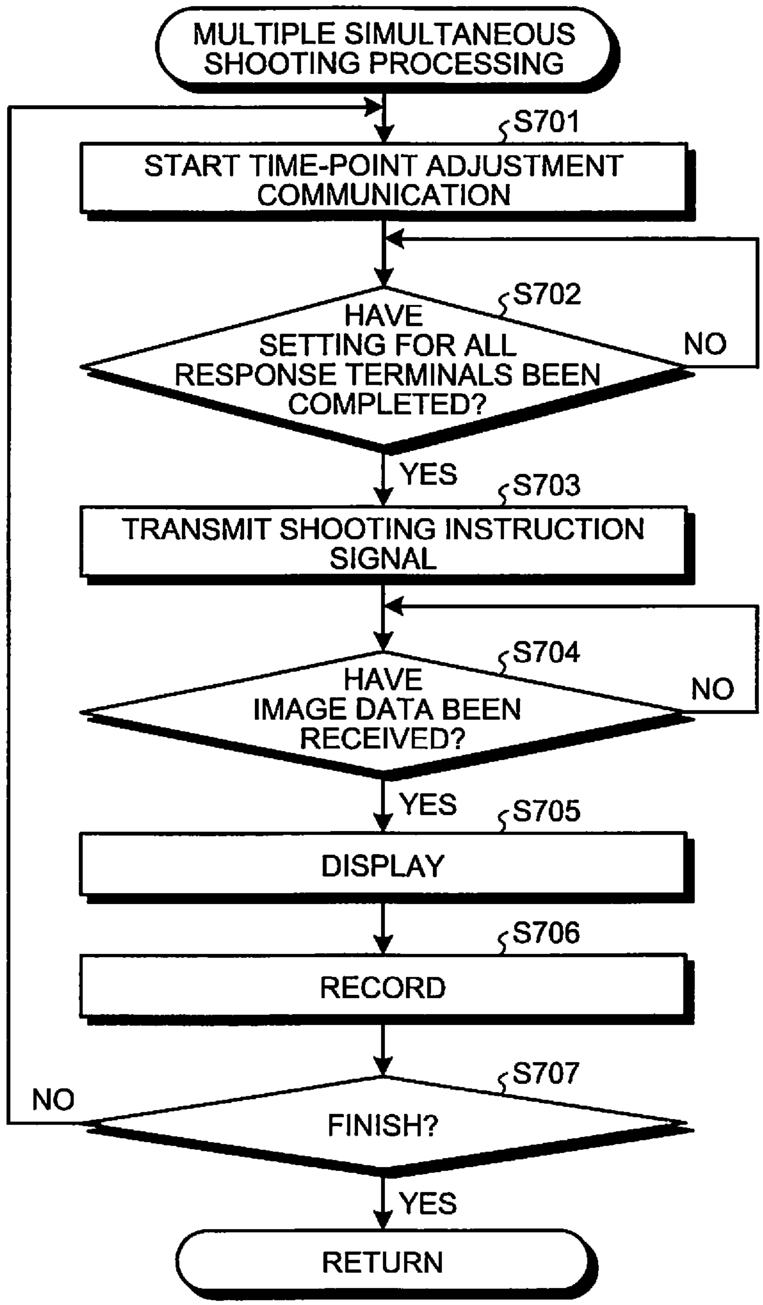
FIG. 16 is a flowchart illustrating an outline of multiple simultaneous shooting processing executed by an instruction terminal according to the second embodiment of the present disclosure.

Next, multiple simultaneous shooting processing executed by the instruction terminal 2 according to the second embodiment will be described. FIG. 16 is a flowchart illustrating an outline of multiple simultaneous shooting processing executed by the instruction terminal 2 according to the second embodiment.

Steps S701 and S702 in FIG. 16 correspond to steps S301 and S302 in above-described FIG. 9, respectively.

In step S703, the first transmission control unit 291 transmits a shooting instruction signal of instructing simultaneous shooting, to each of the response terminals 3*a* to 3*h*.

Steps S704 to S707 correspond to steps S306 to S309 in above-described FIG. 9, respectively. After step S707, the instruction terminal 2 returns to the main routine in FIG. 5.

Multiple Simultaneous Shooting Setting Processing

Figure 17:
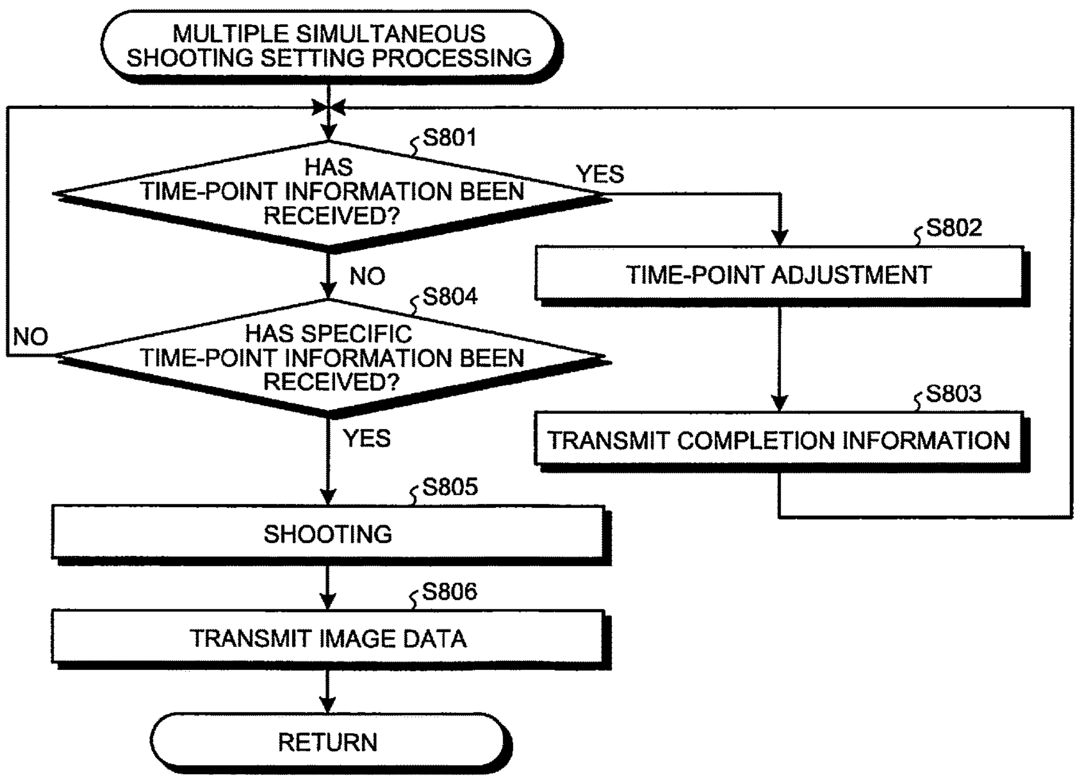
FIG. 17 is a flowchart illustrating an outline of multiple simultaneous shooting setting processing executed by a response terminal according to the second embodiment of the present disclosure.

Next, multiple simultaneous shooting setting processing executed by the response terminal 3*a* according to the second embodiment will be described. FIG. 17 is a flowchart illustrating an outline of multiple simultaneous shooting setting processing executed by the response terminal 3*a* according to the second embodiment. Steps S801 to S804 correspond to steps S601 to S604 in above-described FIG. 14, respectively. Steps S805 and S806 correspond to steps S606 and S607 in above-described FIG. 14, respectively. After step S806, the response terminal 3*a* returns to the main routine in above-described FIG. 12.

According to above-described second embodiment of the present disclosure, even in a case of performing shooting using the plurality of response terminals 3*a* to 3*h*, it is possible to perform the shooting with the same timing or individually designated timings.

Third Embodiment

Next, a third embodiment of the present disclosure will be described. While having a configuration identical to the imaging system 1 according to the above-described first embodiment, an imaging system according to the third embodiment executes operation that differs from the operation executed by the imaging system according to the first embodiment. Specifically, the difference is in multiple simultaneous shooting processing executed by the instruction terminal and multiple simultaneous shooting setting processing executed by the response terminal, according to the third embodiment. Hereinafter, an outline of operation of the imaging system according to the third embodiment will be described first and thereafter, the multiple simultaneous shooting processing executed by the instruction terminal and the multiple simultaneous shooting setting processing executed by the response terminal, according to the third embodiment, will be described. A same reference sign will be given to the configuration identical to the configuration of the imaging system 1 according to the above-described first embodiment, and description for this will be omitted.

Outline of Operation of Imaging System

Figure 18:
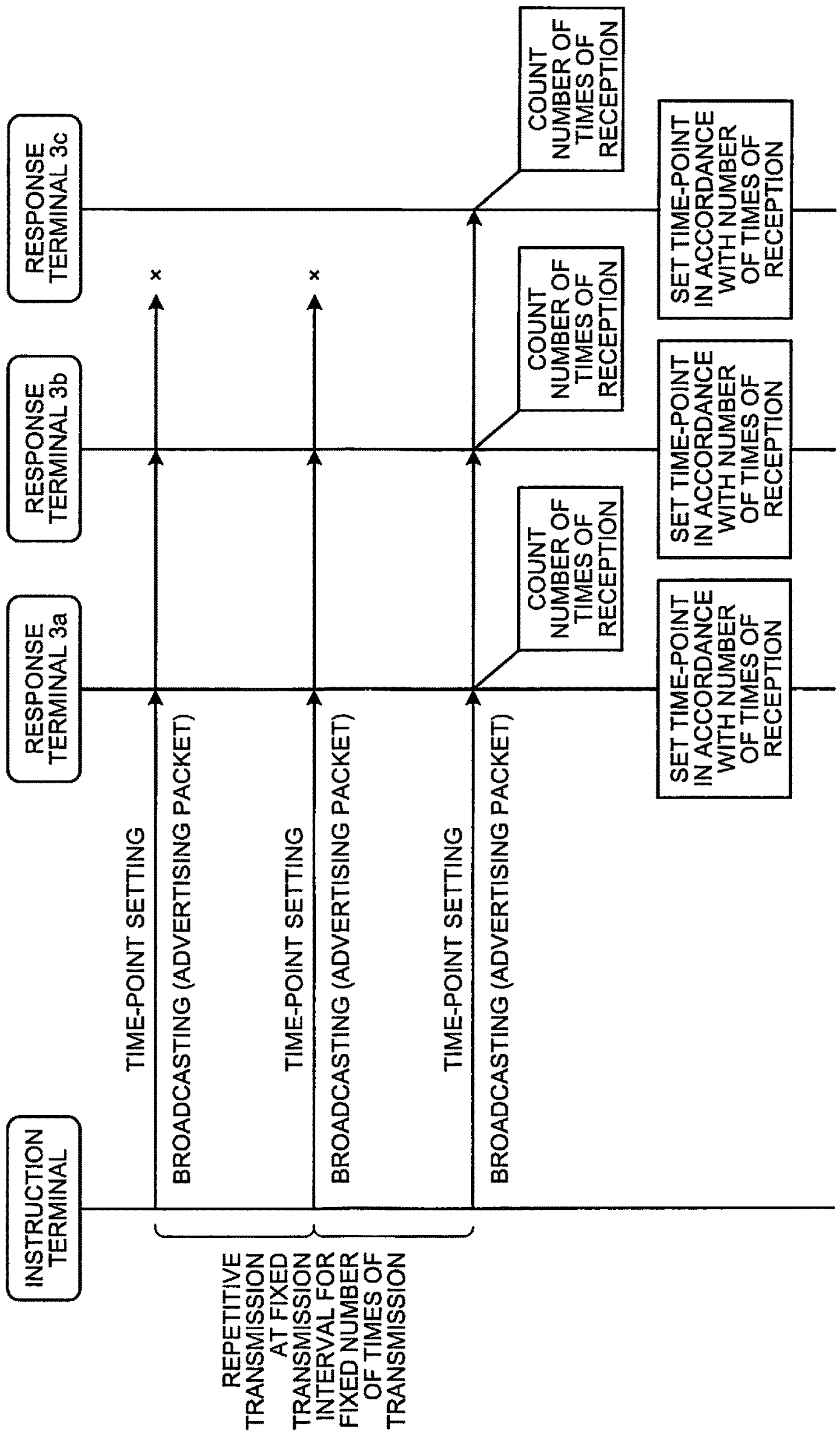
FIG. 18 is a sequence diagram illustrating an outline of operation of an imaging system according to a third embodiment of the present disclosure.

FIG. 18 is a sequence diagram illustrating an outline of operation of the imaging system 1 according to the third embodiment. FIG. 18 includes mode information at the time of device search (discovery) under the Bluetooth (registered trademark) standard. Also note that, in FIG. 18, Service UUID is a unique ID to identify the service under the Bluetooth standard. In the third embodiment, Service UUID is a unique ID indicating time-point information. Furthermore, "Time" is assumed to be a time-point (year/month/date/hour/minute/second).

As illustrated in FIG. 18, the instruction terminal 2 repetitively broadcasts same time-point information (for example, an Advertising Packet) to each of the response terminals 3*a* to 3*c*, with a fixed transmission interval, for the fixed number of times of transmission. Each of the response terminals 3*a* to 3*c* counts the number of times of reception of the time-point information and sets the time-point in accordance with the counted number of times of reception. Specifically, each of the response terminals 3*a* to 3*c* sets the time-point in accordance with a reception pattern table T1 is illustrated in FIG. 19. For example, as illustrated in the reception pattern table T1, when the response terminal 3*a* was able to receive all the time-point information, the time-point is set by first calculating a value by subtracting one from the total number of times of transmission, and next multiplying the result of subtraction by a transmission interval, and then, by adding this result of multiplication.

Figure 20:
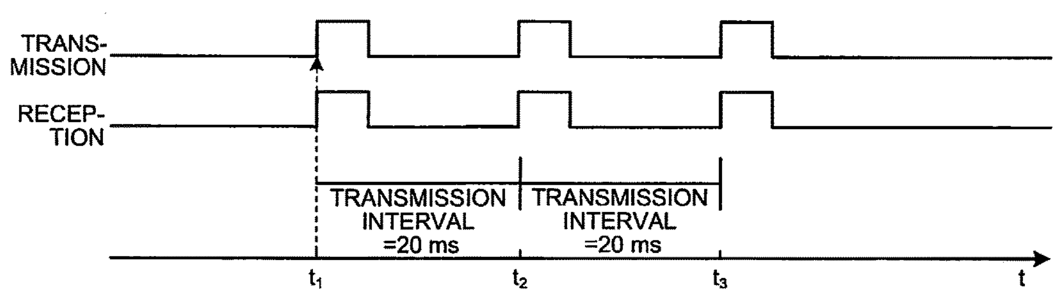
FIG. 20 is a diagram schematically illustrating a time-point setting method when a response terminal according to the third embodiment of the present disclosure was able to receive all time-point information.

FIG. 20 is a diagram schematically illustrating a time-point setting method when the response terminal 3*a* was able to receive all the time-point information. In FIG. 20, it will be assumed that the transmission interval of time-point information by the instruction terminal 2 is 20 ms, the number of times of transmission is three, and the time-point information is 2015/12/12/10/30/00/00.

As illustrated in FIG. 20, with a time-point t1 (first reception) as a starting point (10:30:00:00), when the time-point information was received at each of a time-point t2 and a time-point t3, the time-point adjustment unit 372 sets the time-point (10:30:00:40) specifically by first calculating a value (2) by subtracting one from the total number of times of transmission (3), and next multiplying the result of subtraction (2) by a transmission interval (20 ms), and then, by adding this multiplication result to the starting point t1 (10:30:00:00).

Figure 21:
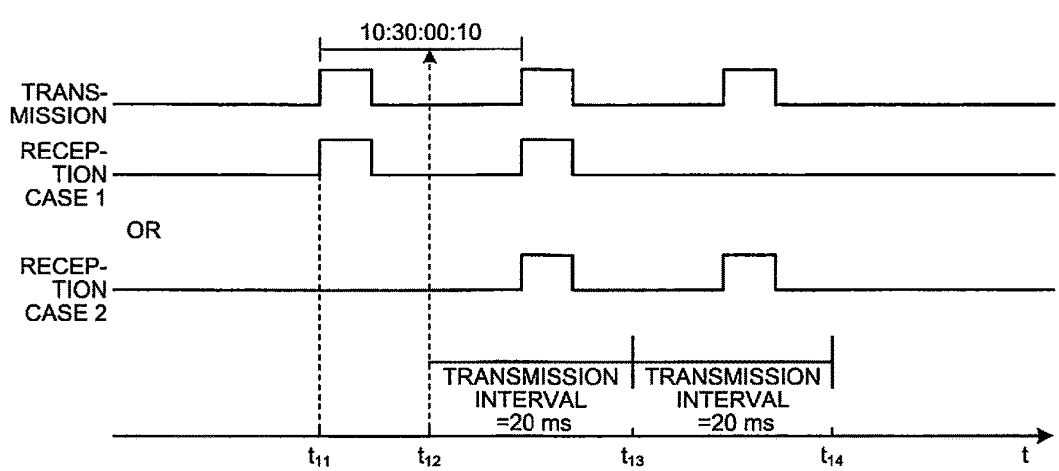
FIG. 21 is a diagram schematically illustrating a time-point setting method when the response terminal according to the third embodiment of the present disclosure was able to receive the time-point information consecutively.

FIG. 21 is a diagram schematically illustrating a time-point setting method when the response terminal 3*a* was able to receive the time-point information consecutively. In FIG. 21, it will be assumed that the transmission interval of time-point information by the instruction terminal 2 is 20 ms, the number of times of transmission is three, and the time-point information is 2015/12/12/10/30/00/00.

As illustrated in FIG. 21, the time-point adjustment unit 372 cannot judge whether the time-point was received with a pattern in Case 1 or Case 2. Accordingly, the time-point adjustment unit 372, while defining an intermediate point (10:30:00:10) between the first reception time-point and the second reception time-point as a starting point, sets a time-point (10:30:00:50) specifically by first calculating a value (2) by subtracting one from the total number of times of transmission (3), and next multiplying the result of subtraction (2) by a transmission interval (20 ms), and then, by adding this multiplication result to the starting point (10:30:00:10). For example, in Case 1, while defining a time-point t12 (10:30:00:10), that is, an intermediate point between a first reception time-point t11 and a second reception time-point t13, as a starting point, the time-point adjustment unit 372 sets a time-point t14 (10:30:00:50) specifically by first calculating a value (2) by subtracting one from the total number of times of transmission (3), and next multiplying the result of subtraction (2) by a transmission interval (20 ms), and then, by adding this multiplication result to the starting point t12 (10:30:00:10). Note that it is also allowable to configure such that the response terminal 3*a* determines the time-point setting as a failure when accuracy is required.

Figure 22:
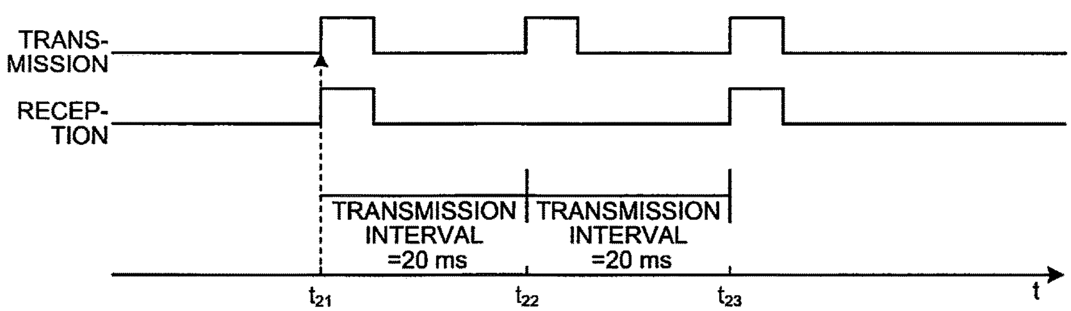
FIG. 22 is a diagram schematically illustrating a time-point setting method when the response terminal according to the third embodiment of the present disclosure was able to receive the time-point information twice out of all the number of times.

FIG. 22 is a diagram schematically illustrating a time-point setting method when the response terminal 3*a* was able to receive the time-point information twice out of all the number of times of transmission. In FIG. 22, it will be assumed that the transmission interval of time-point information by the instruction terminal 2 is 20 ms, the number of times of transmission is three, and the time-point information is 2015/12/12/10/30/00/00.

As illustrated in FIG. 22, with a time-point (10:30:00:00) at which the time-point information was received for the first time as a starting point, the time-point adjustment unit 372 sets the time-point (10:30:00:40) specifically by first calculating a value (2) by subtracting one from the total number of times of transmission (3), and next multiplying the result of subtraction (2) by a transmission interval (20 ms), and then, by adding this multiplication result to the starting point (10:30:00:00). Specifically, with a time-point t21 (10:30:00:00) at which the time-point information was received for the first time as a starting point, the time-point adjustment unit 372 sets a time-point t23 (10:30:00:40) specifically by first calculating a value (2) by subtracting one from the total number of times of transmission (3), and next multiplying the result of subtraction (2) by a transmission interval (20 ms), and then, by adding this multiplication result to the starting point (10:30:00:00). Note that it is also allowable to configure such that the response terminal 3*a* determines the time-point setting as a failure when reception failed twice or more.

Multiple Simultaneous Shooting Processing

Figure 23:
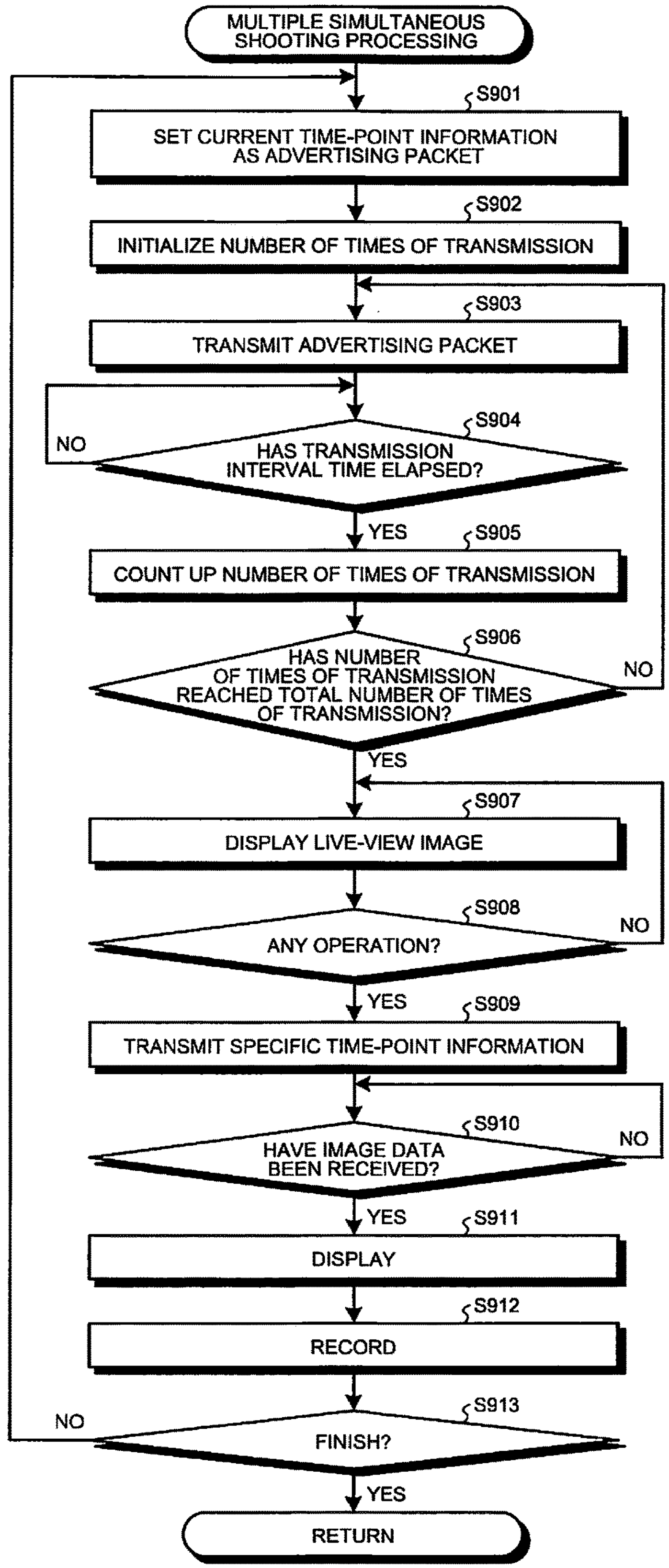
FIG. 23 is a flowchart illustrating an outline of multiple simultaneous shooting processing executed by an instruction terminal according to the third embodiment of the present disclosure.

Next, multiple simultaneous shooting processing executed by the instruction terminal 2 will be described. FIG. 23 is a flowchart illustrating an outline of the multiple simultaneous shooting processing executed by the instruction terminal 2.

As illustrated in FIG. 23, the first transmission control unit 291 first sets the time-point information including the current time-point clocked by the first clock unit 22 as an Advertising packet (step S901).

Subsequently, the first transmission control unit 291 initializes the number of times of transmission (number of times of transmission=0) (step S902), and causes the first communication unit 28 to transmit the Advertising packet to the response terminals 3*a* to 3*h* (step S903).

Thereafter, when a transmission interval time has elapsed (step S904: Yes), the instruction terminal 2 proceeds to step S905 described below. In contrast, when the transmission interval time has not elapsed (step S904: No), the instruction terminal 2 continues this judgment.

In step S905, the first transmission control unit 291 counts up the number of times of transmission. Specifically, the first transmission control unit 291 increments a flag indicating the number of times of transmission.

Subsequently, when the number of times of transmission has reached the total number of times of transmission (step S906: Yes), the instruction terminal 2 proceeds to step S907 described below. In contrast, when the number of times of transmission has not reached the total number of times of transmission (step S906: No), the instruction terminal 2 returns to above-described step S903.

Steps S907 to S913 correspond to steps S303 to S309 in above-described FIG. 9, respectively.

Multiple Simultaneous Shooting Setting Processing

Figure 24:
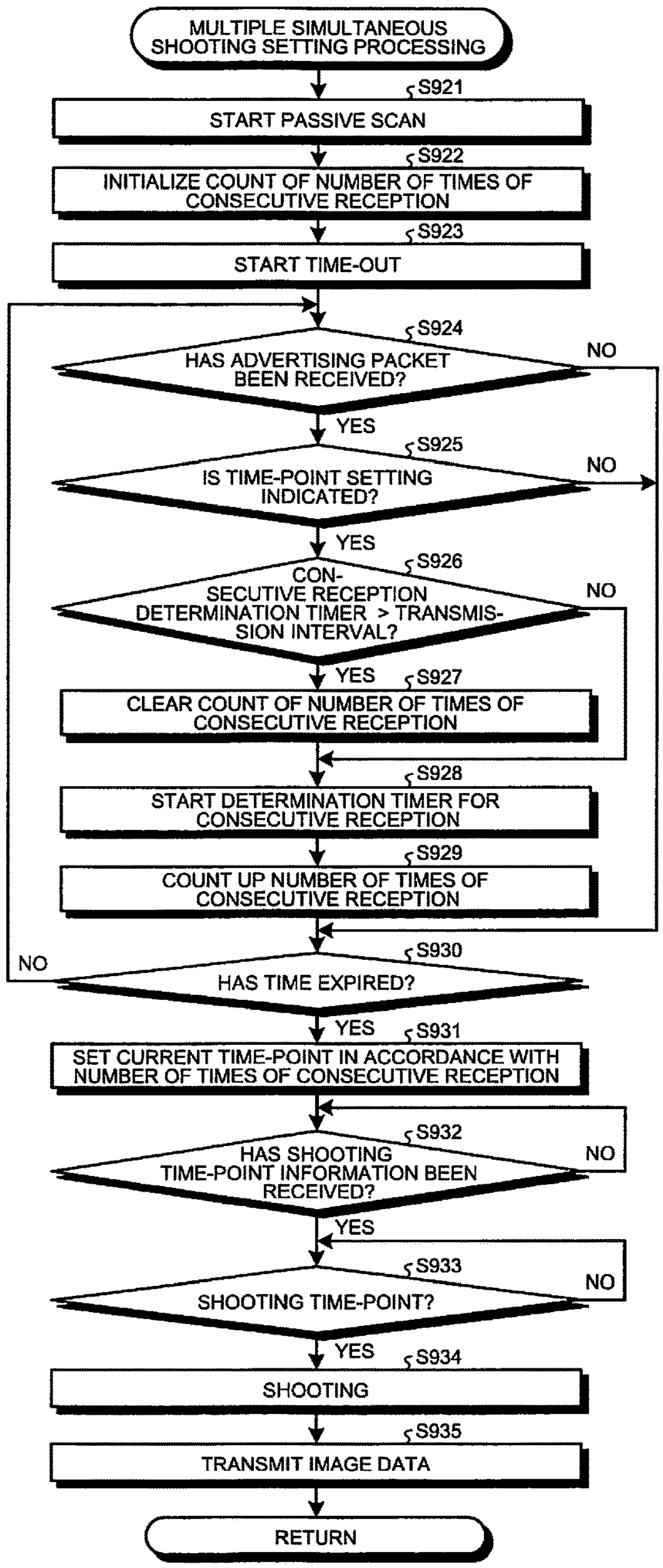
FIG. 24 is a flowchart illustrating an outline of multiple simultaneous shooting setting processing executed by the response terminal according to the third embodiment of the present disclosure.

Next, multiple simultaneous shooting setting processing executed by the response terminal 3*a* according to the third embodiment will be described. FIG. 24 is a flowchart illustrating an outline of the multiple simultaneous shooting setting processing executed by the response terminal 3*a* according to the third embodiment.

First, as illustrated in FIG. 24, the second communication unit 36 starts passive scan (step S921).

Subsequently, the second transmission control unit 371 initializes the count of the number of times of consecutive reception for the Advertising packet (step S922), and starts time-out (step S923).

Thereafter, when the second communication unit 36 has received an Advertising packet from the instruction terminal 2 via the network 4 (step S924: Yes), the response terminal 3*a* proceeds to step S925 described below. In contrast, when the second communication unit 36 has not received the Advertising packet from the instruction terminal 2 via the network 4 (step S924: No), the response terminal 3*a* proceeds to step S930 described below.

In step S925, when an instruction included in the Advertising packet indicates time-point setting (step S925: Yes), the response terminal 3*a* proceeds to step S926 described below. In contrast, when an instruction included in the Advertising packet does not indicate time-point setting (step S925: No), the response terminal 3*a* proceeds to step S930 described below.

In step S926, when a consecutive reception determination timer is set to be greater than the transmission interval (step S926: Yes), the second transmission control unit 371 clears the count of the number of times of consecutive reception (step S927). After step S927, the response terminal 3*a* proceeds to step S928 described below.

In step S926, when the consecutive reception determination timer is set to be no greater than the transmission interval (step S926: No), the response terminal 3*a* proceeds to step S928 described below.

Subsequently, the second transmission control unit 371 starts the determination timer for consecutive reception (step S928), and counts up the number of times of consecutive reception (step S929).

Thereafter, when the time for receiving the Advertising packet from the instruction terminal 2 has expired (step S930: Yes), the response terminal 3*a* proceeds to step S931 described below. In contrast, when the time for receiving the Advertising packet from the instruction terminal 2 has not expired (step S930: No), the response terminal 3*a* returns to above-described step S924.

In step S931, the time-point adjustment unit 372 sets the current time-point clocked by the second clock unit 32 in accordance with the number of times of consecutive reception from the instruction terminal 2. Specifically, the time-point adjustment unit 372 sets the current time-point in accordance with the number of times of consecutive reception, with reference to the above-described reception pattern table T1 in FIG. 19.

Steps S932 to S935 correspond to steps S604 to S607 in above-described FIG. 14, respectively. After step S935, the response terminal 3*a* returns to the main routine in FIG. 12.

According to the above-described third embodiment of the present disclosure, even in a case of shooting using the plurality of response terminals 3*a* to 3*h*, it is possible to perform the shooting with the same timing. It is of course possible to apply this to application in which a plurality of shootings is performed at specific instructed timings, which need not be the same timing.

Other Embodiments

Moreover, the imaging apparatus according to the present disclosure can be applied not only to digital still cameras, but also to other electronic devices such as a digital video camera, tablet-type mobile devices having an imaging function, and a display device to display an image that corresponds to medical or industrial image data captured by an endoscope and a microscope.

A program to be executed by the imaging apparatus according to the present disclosure is provided as file data of an installable format or executable format, by being recorded in a computer readable recording medium, such as a CD-ROM, a flexible disk (FD), a CD-R, a digital versatile disk (DVD), a USB medium, a flash memory.

A program to be executed by the imaging apparatus according to the present disclosure may be configured to be stored on a computer connected to a network such as the Internet and provided by allowing the program to be downloaded via the network. Further, a program to be executed by the imaging apparatus according to the present disclosure may be configured to be provided or distributed via a network such as the Internet.

In the flowcharts in this description, context of the processes among the steps is described by using expressions such as "first", "thereafter", and "subsequently", but the sequences of the processes needed for implementing the present disclosure are not intended to be uniquely defined by these expressions. In other words, the order of processing in the flowcharts described herein can be changed within a range implementable without contradiction.

In this manner, the present disclosure may include various embodiments other than the embodiments described herein. Accordingly, various modifications can be made without departing from the defined spirit or scope of the general inventive concept.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging system comprising:

an instruction terminal configured to transmit, via a network, specific time-point information used to cause each of a plurality of response terminals to perform specific operation at a specific time-point, to each of the plurality of response terminals; and the plurality of response terminals configured to receive, via the network, the specific time-point information and execute the specific operation at the specific time-point, wherein, before transmitting the specific time-point information, the instruction terminal transmits time-point information including at least information that corresponds to a time-point clocked by the instruction terminal, to each of the plurality of response terminals, and the response terminal adjusts the time-point clocked by the response terminal to the time-point information when the response terminal has received the time-point information, and thereafter, the response terminal executes the specific operation at the specific time-point when the response terminal receives the specific time-point information, wherein the instruction terminal repetitively transmits the time-point information at a predetermined interval to each of the plurality of response terminals, and wherein the response terminal adjusts the time-point clocked by the response terminal to the time-point information in accordance with the number of times of reception of the time-point information.

2. An imaging system comprising:

an instruction terminal configured to transmit, via a network, specific time-point information used to cause each of a plurality of response terminals to perform specific operation at a specific time-point, to each of the plurality of response terminals; and the plurality of response terminals configured to receive, via the network, the specific time-point information and execute the specific operation at the specific time-point, wherein, before transmitting the specific time-point information, the instruction terminal transmits time-point information including at least information that corresponds to a time-point clocked by the instruction terminal, to each of the plurality of response terminals, and the response terminal adjusts the time-point clocked by the response terminal to the time-point information when the response terminal has received the time-point information, and thereafter, the response terminal executes the specific operation at the specific time-point when the response terminal receives the specific time-point information, wherein the response terminal transmits setting completion information indicating that the time-point clocked by the response terminal has been adjusted to the time-point information, to the instruction terminal.

3. The imaging system according to claim 2, wherein the instruction terminal simultaneously transmits the time-point information to each of the plurality of response terminals.

4. The imaging system according to claim 2, wherein the instruction terminal sequentially transmits the time-point information to each of the plurality of response terminals.

5. The imaging system according to claim 2, wherein, when the setting completion information has been received from each of the plurality of response terminals, the instruction terminal transmits the specific time-point information to each of the plurality of response terminals.

6. The imaging system according to claim 2, wherein the specific operation is any of imaging, light emission, voice output, display, recording, and moving image shooting.

7. An instruction terminal configured to transmit, via a network, specific time-point information used to cause each of a plurality of response terminals to perform specific operation at a specific time-point, to each of the plurality of response terminals, the instruction terminal comprising:

a transmitter/receiver configured to communicate with the plurality of response terminals via the network;

a clock configured to clock a time-point; and a control processor configured to cause the transmitter/receiver to transmit time-point information including at least information that corresponds to a time-point clocked by the instruction terminal, to each of the plurality of response terminals, before transmitting the specific time-point information, wherein the transmitter/receiver receives setting completion information transmitted from the response terminal and indicating that the time-point clocked by the response terminal has been adjusted to the time-point information.

8. A response terminal configured to perform, via a network, specific operation at a specific time-point in cooperation with another device, the response terminal comprising:

a transmitter/receiver configured to receive information from an instruction terminal that transmits specific time-point information needed to perform the specific operation at a specific time-point, while transmitting information to the instruction terminal;

a clock configured to clock a time-point; and a control processor configured to adjust a time-point clocked by the clock to time-point information when the time-point information including information that corresponds to a time-point clocked by the instruction terminal has been received by the transmitter/receiver, and cause the response terminal to execute the specific operation when the transmitter/receiver has received the specific time-point information from the instruction terminal.

9. An imaging method executed by an imaging system including: an instruction terminal configured to transmit, via a network, specific time-point information used to cause each of a plurality of response terminals to perform specific operation at a specific time-point, to each of the plurality of response terminals; and the plurality of response terminals configured to receive, via the network, the specific time-point information and execute the specific operation at the specific time-point, the method comprising:

causing the instruction terminal to transmit, before transmitting the specific time-point information, time-point information including at least information that corresponds to a time-point clocked by the instruction terminal, to each of the plurality of response terminals;

causing the response terminal to adjust the time-point clocked by the response terminal to the time-point information when the response terminal has received the time-point information;

causing the instruction terminal to transmit the specific time-point information; and causing the response terminal to execute the specific operation at the specific time-point, wherein the response terminal transmits setting completion information indicating that the time-point clocked by the response terminal has been adjusted to the time-point information, to the instruction terminal.

10. A non-transitory computer-readable recording medium with an executable program stored thereon, the program causing a processor of an imaging system including: an instruction terminal configured to transmit, via a network, specific time-point information used to cause each of a plurality of response terminals to perform specific operation at a specific time-point, to each of the plurality of response terminals; and the plurality of response terminals configured to receive, via the network, the specific time-point information and execute the specific operation at the specific time-point to execute:

causing the instruction terminal to transmit, before transmitting the specific time-point information, time-point information including at least information that corresponds to a time-point clocked by the instruction terminal, to each of the plurality of response terminals;

causing the response terminal to adjust the time-point clocked by the response terminal to the time-point information when the response terminal has received the time-point information;

causing the instruction terminal to transmit the specific time-point information; and causing the response terminal to execute the specific operation at the specific time-point, wherein the response terminal transmits setting completion information indicating that the time-point clocked by the response terminal has been adjusted to the time-point information, to the instruction terminal.

* * * * *